US011353611B2

(12) United States Patent
Poole et al.

(10) Patent No.: US 11,353,611 B2
(45) Date of Patent: Jun. 7, 2022

(54) WAVE-FIELD RECONSTRUCTION USING A REFLECTION FROM A VARIABLE SEA SURFACE

(71) Applicant: CGG SERVICES SAS, Massy (FR)

(72) Inventors: Gordon Poole, East Grinstead (GB); Simon King, Crawley (GB)

(73) Assignee: CGG SERVICES SAS, Massy (FR)

( * ) Notice: Subject to any disclaimer, the term of this patent is extended or adjusted under 35 U.S.C. 154(b) by 1199 days.

(21) Appl. No.: 15/507,986

(22) PCT Filed: Sep. 9, 2015

(86) PCT No.: PCT/IB2015/001930
§ 371 (c)(1),
(2) Date: Mar. 1, 2017

(87) PCT Pub. No.: WO2016/038458
PCT Pub. Date: Mar. 17, 2016

(65) Prior Publication Data
US 2017/0248721 A1  Aug. 31, 2017

Related U.S. Application Data

(60) Provisional application No. 62/048,286, filed on Sep. 10, 2014.

(51) Int. Cl.
G01V 1/36 (2006.01)
G01V 1/38 (2006.01)

(52) U.S. Cl.
CPC ............ G01V 1/366 (2013.01); G01V 1/36 (2013.01); G01V 1/364 (2013.01); G01V 1/38 (2013.01);
(Continued)

(58) Field of Classification Search
CPC ...................................... G01V 1/366
See application file for complete search history.

(56) References Cited

U.S. PATENT DOCUMENTS 9,103,941 B2  8/2015  Poole
9,535,181 B2  1/2017  Poole
(Continued)

FOREIGN PATENT DOCUMENTS

WO    2015159149 A3    1/2016

OTHER PUBLICATIONS

International Search Report in related International Application No. PCT/IB2015/001930, dated Jun. 6, 2016.
(Continued)

Primary Examiner — Hyun D Park
(74) Attorney, Agent, or Firm — Patent Portfolio Builders PLLC

(57) ABSTRACT

Computing device, computer instructions and method for processing energy at a free-surface reflection relating to an air-water interface. The method includes receiving input seismic data recorded with seismic sensors; receiving wave-height data that describes an actual shape of a top surface of a body of water; processing up-going energy at a receiver and down-going energy following a reflection at the sea-surface, using the input seismic data and a linear operator modified to take into account the wave-height data; and generating an image of the subsurface based on the up-going energy or the down-going energy or a combination of the input seismic data and one of the up-going or down-going energy.

20 Claims, 20 Drawing Sheets

(52) U.S. Cl.
CPC ...... *G01V 2210/56* (2013.01); *G01V 2210/57* (2013.01)

(56) References Cited

U.S. PATENT DOCUMENTS

| | | | |
|---|---|---|---|
| 2006/0291328 A1* | 12/2006 | Robertsson | G01V 1/36 367/24 |
| 2007/0189117 A1* | 8/2007 | Robertsson | G01V 1/36 367/24 |
| 2013/0163379 A1 | 6/2013 | Poole | |
| 2015/0109881 A1 | 4/2015 | Poole et al. | |
| 2016/0187513 A1 | 6/2016 | Poole et al. | |
| 2017/0010375 A1 | 1/2017 | Poole | |

OTHER PUBLICATIONS

Written Opinion of the International Searching Authority in related International Application No. PCT/IB2015/001930, dated Jun. 6, 2016.

L. Amundsen et al, "Rough-sea Deghosting of Streamer Seismic Data Using Pressure Gradient Approximations", Geophysics, Jan.-Feb. 2005, vol. 70, No. 1, pp. V1-V9.

E. Kragh et al., "Sea Surface Shape Derivation Above the Seismic Streamer", EAGE 64th Conference & Exhibition—Florence, Italy, May 30, 2002.

R. Laws et al., "Sea Surface Shape Derivation Above the Seismic Streamer", Geophysical Prospecting, 2006, 54, pp. 817-828.

O. Orji et al., "Imaging the Sea Surface Using a Dual-sensor Towed Streamer", GEOPHYSICS, Nov.-Dec. 2010, vol. 75, No. 6, pp. V111-V118.

G. Poole, "Pre-migration Receiver De-ghosting and Re-datuming for Variable Depth Streamer Data", SEG Annual Meeting, Houston, Texas, 2013, SEG Technical Expanded Abstracts 2013.

G. Poole, "Wavefield Separation Using Hydrophone and Particle Velocity Components with Arbitrary Orientation", SEG Annual Meeting, Denver, Colorado, 2014, SEG Technical Expanded Abstracts 2014.

J.O.A. Robertsson et al., "Rough-sea Deghosting Using a Single Streamer and a Pressure Gradient Approximation", GEOPHYSICS, Nov.-Dec. 2002, vol. 67, No. 6, pp. 2005-2011.

P. Wang et al., "3D Joint Deghosting and Crossline Interpolation for Marine Single-component Streamer Data", SEG Annual Meeting, Denver, Colorado, 2014, SEG Technical Expanded Abstracts 2014.

P. Wang et al., "Joint Hydrophone and Accelerometer Receiver Deghosting Using Sparse Tau-P Inversion", SEG Annual Meeting, Denver, Colorado, 2014, SEG Technical Expanded Abstracts 2014.

P. Wang et al., "Premigration Deghosting for Marine Streamer Data Using a Bootstrap Approach in Tau-P Domain", SEG Annual Meeting, Houston, Texas, 2013, SEG Technical Expanded Abstracts 2013.

P. Wang et al., "Premigration Deghosting for Marine Towed Streamer Data Using a Bootstrap Approach", SEG Annual Meeting, Las Vegas, Nevada, 2012, SEG Technical Expanded Abstracts 2012.

G. Poole, et al.; "Shot-to-shot directional designature using near-field hydrophone data"; SEG Houston 2013 Annual Meeting; Society of Exploration Geophysicists; SEG Technical Program Expanded Abstracts 2013; Aug. 2013; pp. 4236-4240.

P. Wang, et al.; Model-based water-layer demultiple; SEG Technical Program Expanded Abstracts 2011; Jan. 2011; pp. 3551-3555.

Office Action in corresponding/related European Application No. 15 797 392.6 dated Feb. 24, 2021.

\* cited by examiner

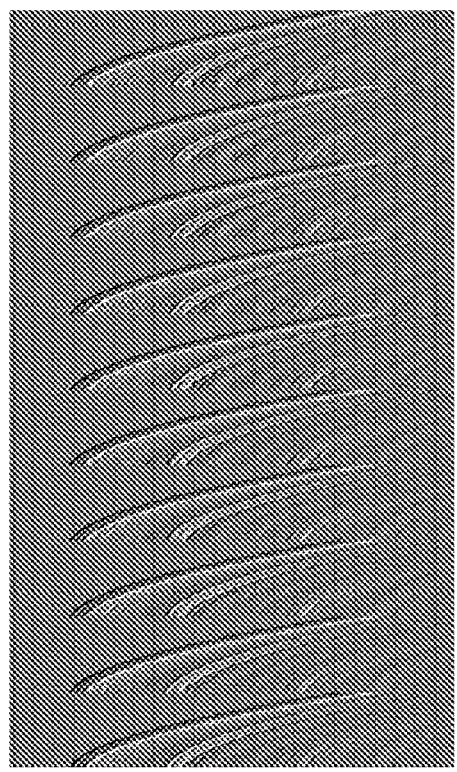
FIG. 11A
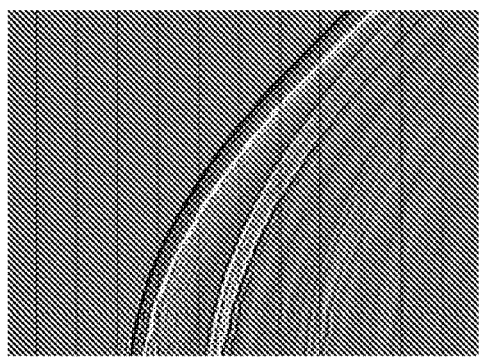
FIG. 10A
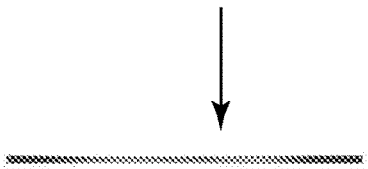
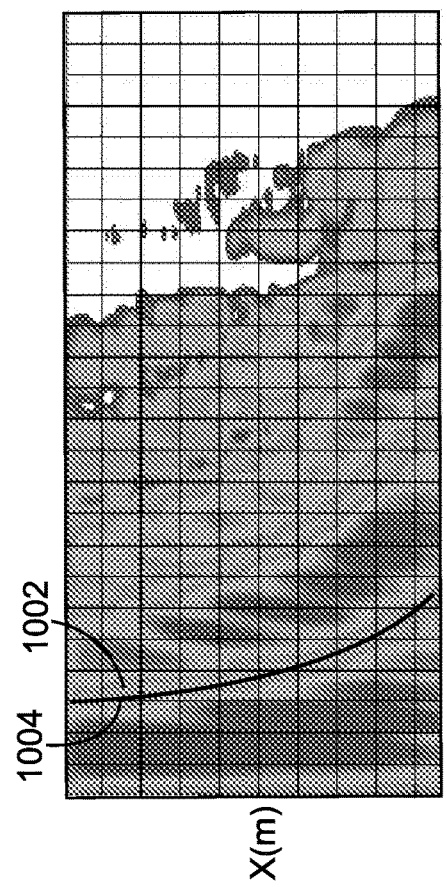
FIG. 11B
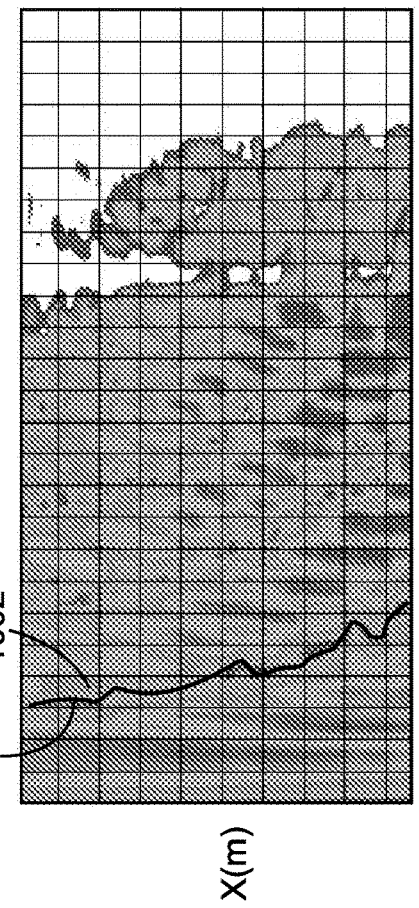
FIG. 10B

WAVE-FIELD RECONSTRUCTION USING A REFLECTION FROM A VARIABLE SEA SURFACE

CROSS-REFERENCE TO RELATED APPLICATIONS

The present application claims the benefit of priority of U.S. Provisional Application 62/048,286, having the title "Wavefield Reconstruction Using Wave Height Data," and being authored by G. Poole and S. King, the entire contents of which are incorporated herein by reference.

BACKGROUND

Technical Field

Embodiments of the subject matter disclosed herein generally relate to methods and systems and, more particularly, to mechanisms and techniques for processing seismic data (e.g., deghosting) collected with one or more marine seismic sensors.

Discussion of the Background

Marine seismic data acquisition and processing generate a profile (image) of the geological structure (subsurface) under the seafloor. While this profile does not provide an accurate location for oil and gas, it suggests, to those trained in the field, the presence or absence of oil and/or gas. Thus, providing a high-resolution image of the subsurface is an ongoing process for the exploration of natural resources, including, among others, oil and/or gas.

During a seismic gathering process, as shown in FIG. 1, a vessel 110 tows plural detectors 112. The plural detectors 112 are disposed along a cable 114. Cable 114 together with its corresponding detectors 112 are sometimes referred to, by those skilled in the art, as a streamer 116. Vessel 110 may tow plural streamers 116 at the same time. The streamers may be disposed horizontally, i.e., lying at a constant depth $z_1$ relative to the surface 118 of the ocean. Also, the plural streamers 116 may form a constant angle (i.e., the streamers may be slanted) with respect to the surface of the ocean as disclosed in U.S. Pat. No. 4,992,992, the entire content of which is incorporated herein by reference. Further, the streamer may have a curved shape, as disclosed, for example, in U.S. Pat. No. 8,593,904.

Still with reference to FIG. 1, vessel 110 also tows a sound source 120 configured to generate an acoustic wave 122a. Acoustic wave 122a propagates downward and penetrates the seafloor 124, eventually being reflected by a reflecting structure 126 (reflector R). The reflected acoustic wave 122b propagates upward and is detected by detector 112. For simplicity, FIG. 1 shows only two paths 122a corresponding to the acoustic wave. However, the acoustic wave emitted by the source 120 may be substantially a spherical wave, e.g., it propagates in all directions starting from the source 120. Parts of the reflected acoustic wave 122b (primary or up-going wave) are recorded by the various detectors 112 (the recorded signals are called traces) while parts of the reflected wave 122c pass detectors 112 and arrive at the water surface 118. Since the interface between the water and air is well approximated as a quasi-perfect reflector (i.e., the water surface acts as a mirror for the acoustic waves), the reflected wave 122c is reflected back toward the detector 112 as shown by wave 122d in FIG. 1. Wave 122d is normally referred to as a ghost wave (or down-going wave) because this wave is due to a spurious reflection. The ghosts are also recorded by the detector 112, but with a reverse polarity and a time lag relative to the primary wave 122b. The degenerative effect that the ghost arrival has on seismic bandwidth and resolution is known. In essence, interference between primary and ghost arrivals causes notches, or gaps, in the frequency content recorded by the detectors.

The traces recorded by sensors 112 may be used to determine an image of the subsurface (i.e., earth structure below surface 124) and to determine the position and presence of reflectors 126. However, the ghosts disturb the accuracy of the final image of the subsurface and, for at least this reason, various methods exist for removing the ghosts, i.e., deghosting, from the results of a seismic analysis.

Over the years, many algorithms have been developed to suppress the ghost reflections. This process is commonly known in the art as deghosting, ghost wave-field elimination or wave-field separation. Many of these algorithms assume that the reflecting sea surface 118 is at a constant datum. In fact, various factors (e.g., wind, air pressure, earthquakes, moving vessels, etc.) cause the sea surface to vary in time and space. The sea surface is thus better described by a wave than the traditional flat, horizontal, plane. This wave shape can cause the travel-time (time to travel from the source 120 to sensor 112) of the ghost reflection 122d to deviate from the traditionally calculated travel-time (with flat sea surface) by an unknown time delay. As a result, the quality of the wave-field separation can be degraded. This affects the quality of further seismic processing and ultimately, the final image of the earth's reflectivity.

A method for determining the sea surface shape is disclosed in Kragh et al., 2002, "Sea surface shape derivation above the seismic streamer," 64th Meeting, EAGE, Expanded Abstracts, A007. According to this method, very low frequencies (<0.5 Hz) of the pressure wave-field need to be recorded. These recordings are then used to invert for wave heights. However, recording such low frequencies requires a modified acquisition set up, which is undesirable.

Robertsson et al., 2002, "Rough sea deghosting using a single streamer and a pressure gradient approximation," Geophysics, 67, 2005-2011, performs a ghost correction on single sensor (pressure) data by estimating the vertical pressure gradient. This process requires continuous measurements of the wave height above the streamer. The approach is limited to frequencies below the first ghost notch.

Amundsen et al., 2005, "Rough sea deghosting of streamer seismic data using pressure gradient approximations," Geophysics, 70, no. 1, V1-V9, derive an improved estimate of the vertical pressure gradient (from Robertsson et al. (2002)) using a binomial series expansion. As above, this approach requires continuous measurements of wave height along the streamer, which is not easy to obtain.

Orji et al., 2010, "Imaging the sea surface using a dual-sensor towed streamer," Geophysics, vol. 75, no. 6, pp. V111-V118, image the sea surface by extrapolating the separated up-going and down-going wave fields (obtained from a multi-sensor streamer) upwards and performing an imaging condition. This imaging step allows for an estimation of wave height.

However, all these methods require either continuous measurements of the wave height along the streamer or a substantial modification of the acquisition set up, neither of which is desired. Thus, there is a need for methods that use the correct ghost's travel-time and not need to modify the existing acquisition set up. Accordingly, it would be desirable to provide systems and methods that have such capabilities.

SUMMARY

According to an exemplary embodiment, there is a method for processing energy at a free-surface reflection relating to an air-water interface. The method includes receiving input seismic data recorded with seismic sensors; receiving wave-height data that describes an actual shape of a top surface of a body of water; processing up-going energy at a receiver and down-going energy following a reflection at the sea-surface, using the input seismic data and a linear operator modified to take into account the wave-height data; and generating an image of the subsurface based on the up-going energy or the down-going energy or a combination of the input seismic data and one of the up-going or down-going energy.

According to another embodiment, there is a computing device for processing energy at a free-surface reflection relating to an air-water interface. The computing device includes an interface for receiving input seismic data recorded with seismic sensors and for receiving wave-height data that describes an actual shape of a top surface of a body of water, and a processor connected to the interface. The processor is configured to process up-going energy at a receiver and down-going energy following a reflection at the sea-surface, using the input seismic data and a linear operator modified to take into account the wave-height data, and generate an image of the subsurface based on the up-going energy or the down-going energy or a combination of the input seismic data and one of the up-going or down-going energy.

According to another embodiment, there is a non-transitory computer readable medium that includes computer executable instructions. When the instructions are executed by a processor, a method for processing energy as noted above is achieved.

BRIEF DESCRIPTION OF THE DRAWINGS

The accompanying drawings, which are incorporated in and constitute a part of the specification, illustrate one or more embodiments and, together with the description, explain these embodiments. In the drawings:

FIGS. 10A-B illustrate a notch picking method for single shot data;

FIGS. 11A-B illustrate a notch picking method for multiple shot data;

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a marine seismic acquisition system that collects seismic data using streamers. However, the embodiments to be discussed next are not limited to data acquired by streamers, but they may be applied to data acquired using ocean bottom sensors (OBC (cable based system) or OBN (node based system)), land acquisition, or to an acquisition system that uses autonomous underwater vehicles (AUVs), etc.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an exemplary embodiment, the wave height is calculated based on a new method, to be discussed later, and then a deghosting scheme is modified to take into account the wave height. Thus, the modified deghosting scheme produces corrected ghosts, which are removed from the seismic data for improving an image of the surveyed subsurface. Alternatively, the corrected ghosts may be used to generate the image. The term "wave" used herein to describe the deviation of the sea surface from the flat horizontal plane, which is traditionally associated with the sea surface, should not be construed in a narrow way to imply only a wave defined by a well-established equation, for example, a sinusoid. While the term "wave" includes such description, it is also intended to include choppy waves, or movements of the sea surface that cannot be described by a mathematical equation. Thus, the term "wave," when used herein, includes any possible shape taken by the sea surface due to wind, currents, pressure or any other factor.

According to another embodiment, the wave height calculation and the ghost modification are performed simultaneously in a single step, as also will be discussed later.

According to these embodiments, the deghosting or wave-field reconstruction can include one or more of the following: wave-field separation (i.e., up/down separation, also often known as deghosting), spatial reconstruction (i.e., in x, and/or y, and/or z, where z relates to a re-datum, and y relates to interpolation between the streamers or extrapolation away from the streamer spread), receiver motion correction, demultiple, or denoise.

Figure 2:
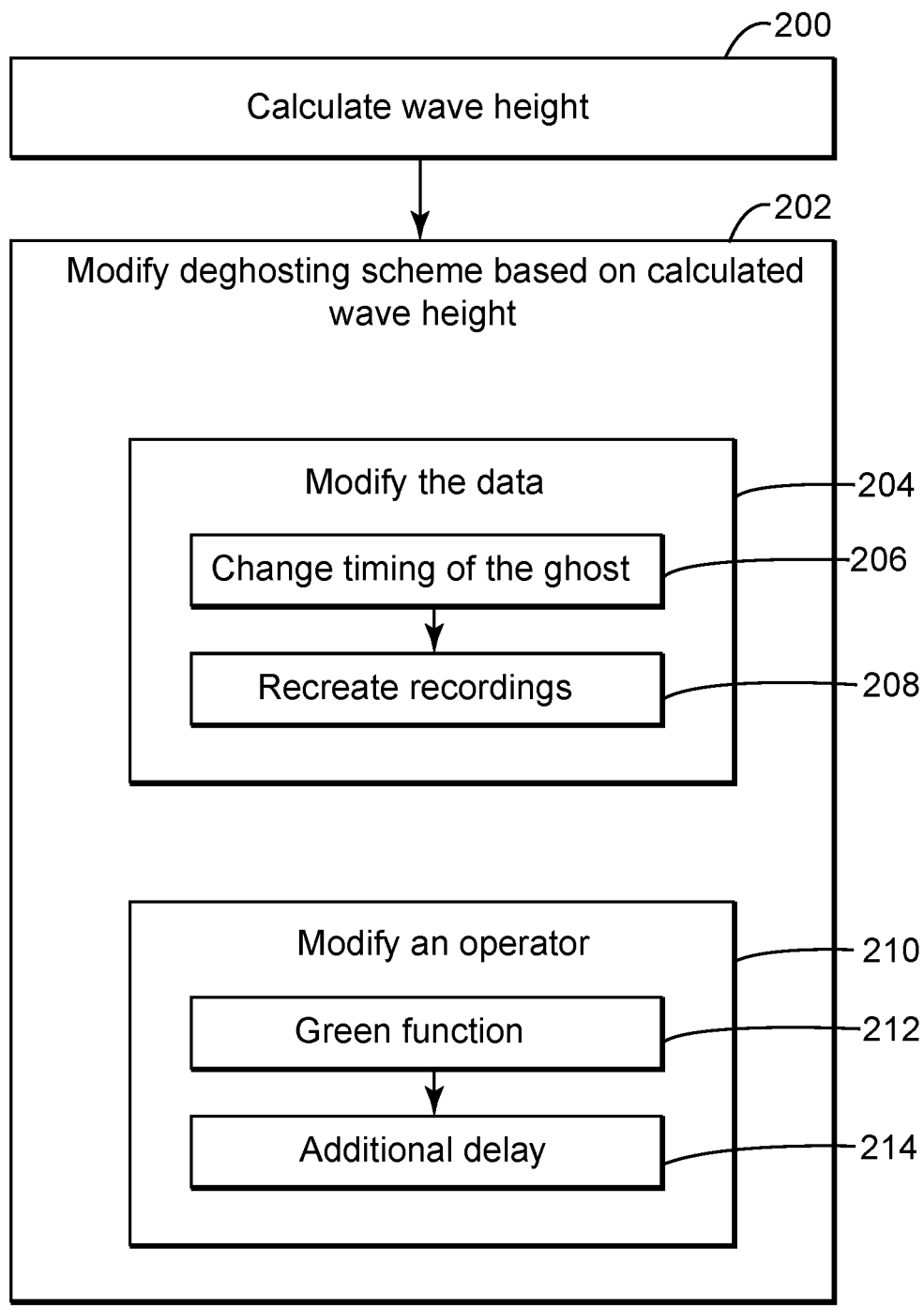
FIG. 2 is a flowchart of a method for calculating the wave height and modifying a deghosting scheme based on calculated wave height.

According to an embodiment illustrated in FIG. 2, a method for calculating more accurate ghost wave fields includes a step 200 of calculating a wave height associated with the sea surface above which the streamer is located, and a step 202 of modifying a deghosting scheme based on the calculated wave height from step 200. Step 202, as will be discussed later, can include a sub-step 204 of modifying the recorded data or a sub-step 210 of modifying an operator that is used for deghosting. Sub-step 204 may include a step 206 of changing the timing of the ghost to simulate data recorded with a flat sea surface and a step 208 of simulating recordings (hydrophone-only and/or multicomponent) using the time-corrected ghost reflection. Sub-step 210 of modifying the operator (e.g., a linear operator) in the deghosting scheme may include a step 212 of modifying ghost timings in a linear operator that may be described by Green functions for the ghost delay relative to the primary, and/or a step 214 of modifying the ghost timings in a linear operator based on additional delays. The modifications may be in 1D (1 dimensional), 2D or 3D. An additional delay in 1D may relate to a different shift (e.g., static shift) for each trace in an (x-t) domain, for example, with the assumption of vertical propagation. A 1D shift may be corrected based on the offset dependent slowness of an input event used in the analysis. For example, the water bottom reflection may be selected for the analysis using a mute, following which it is propagated and cross-correlated to calculate time shifts. The offset dependent slowness of the water bottom reflection may be calculated using event picking. Alternatively, the slowness may be calculated assuming a known or calculated water-depth. The slowness may then be used to correct a time shift to a receiver depth using trigonometry, e.g., receiver depth=speed of sound in water*cross-correlation time shift*cos(theta), where angle theta relates to the angle of incidence of the incoming ray from vertical and may be calculated from the slowness (for example using the relation $\sin \theta = s_m v_w$). Additional delays in 2D or 3D may be a function of both propagation angle and wave height. As such, these delays may become part of an operator which combines a reverse model transform and wave-height correction.

The steps of the method illustrated in FIG. 2 are now discussed in more detail. Step 200 may use various strategies to calculate the wave's height. While designature and/or deghosting may be applied on a range of shots as described in WO/2015/011160A1, the discussion of this step herein generally relates to the processing of each shot separately. This means that data associated with one single shot is used for calculating the wave's height. For a next shot, the corresponding recorded data is used to calculate the new wave's height and so on. However, in one application, results of the wave's height can be stabilized by estimating wave height variations on more than one shot at a time, based on the fact that wave positions will vary slowly from shot to shot.

An embodiment for determining the wave's height using single component seismic data is now discussed. Single component seismic data may be recorded when the seismic sensors are hydrophones. Another possibility is to have the seismic sensors as accelerometers (i.e., collecting particle motion or velocity along one axis, e.g., $V_z$ data).

Figure 3:
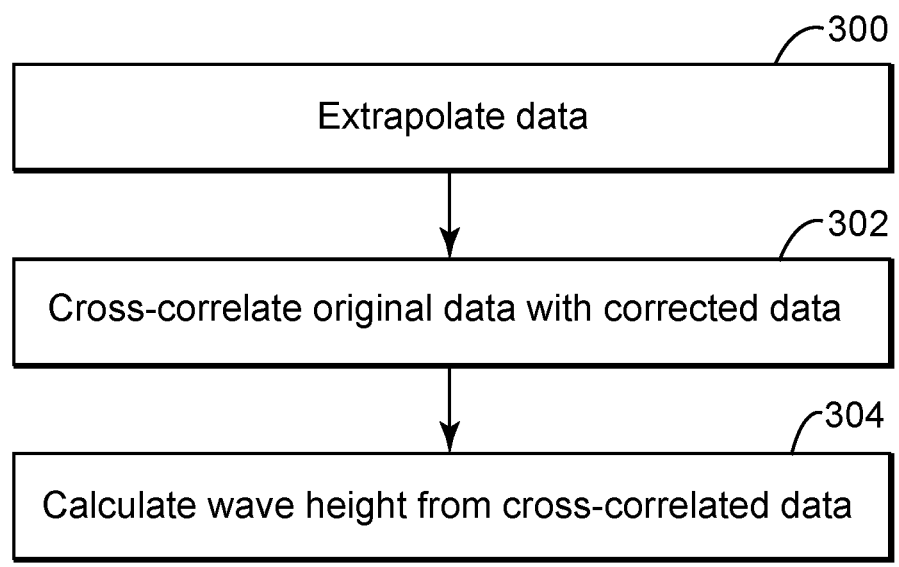
FIG. 3 is a flowchart of a method for calculating the wave height.
Figures 4A, 4B, 4C, 4D:
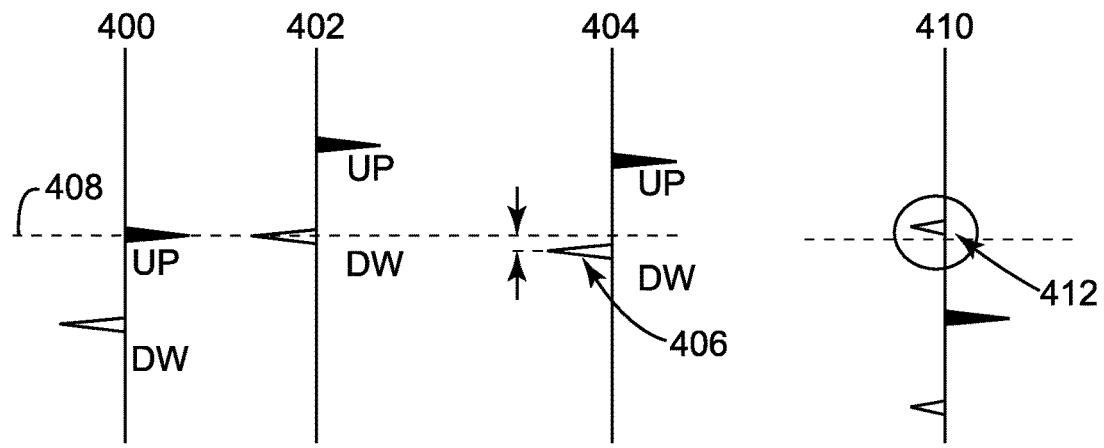
FIGS. 4A-D illustrate the transformation of the seismic data at various steps of the method illustrated in FIG. 3.

According to a first method illustrated in FIG. 3, a cross-correlation approach is used for determining the wave's height. In step 300, the pressure data (assuming that the single component seismic data is recorded using hydrophones) are extrapolated to align the up-going field with the recorded down-going field. FIG. 4A shows originally recorded data 400 including the up-going field UP and the down-going field DW, which are separated by a given time. The time difference may depend on the depth of the sensor below the sea surface, the wave height and the incoming angle of the energy. However, note that at this point the seismic data has not been processed to separate the ghost from the primary. Primary and ghost are easily distinguishable in FIG. 4A as this figure illustrates primary and ghost relating to a single reflection. FIG. 4B shows the UP and DW fields after backwards extrapolation using the correct sea datum (wave height). In this case the UP in FIG. 4A and DW in FIG. 4B have been aligned. FIG. 4C shows data after extrapolation using an incorrect (e.g., flat) sea surface assumption. As the extrapolation assumptions were not consistent with the recording environment, it is possible to observe a small time delay 406. The time delay relates to the difference in reflection time relating to the non-flat sea surface and the flat sea surface assumed in the re-datuming process.

Figure 1:
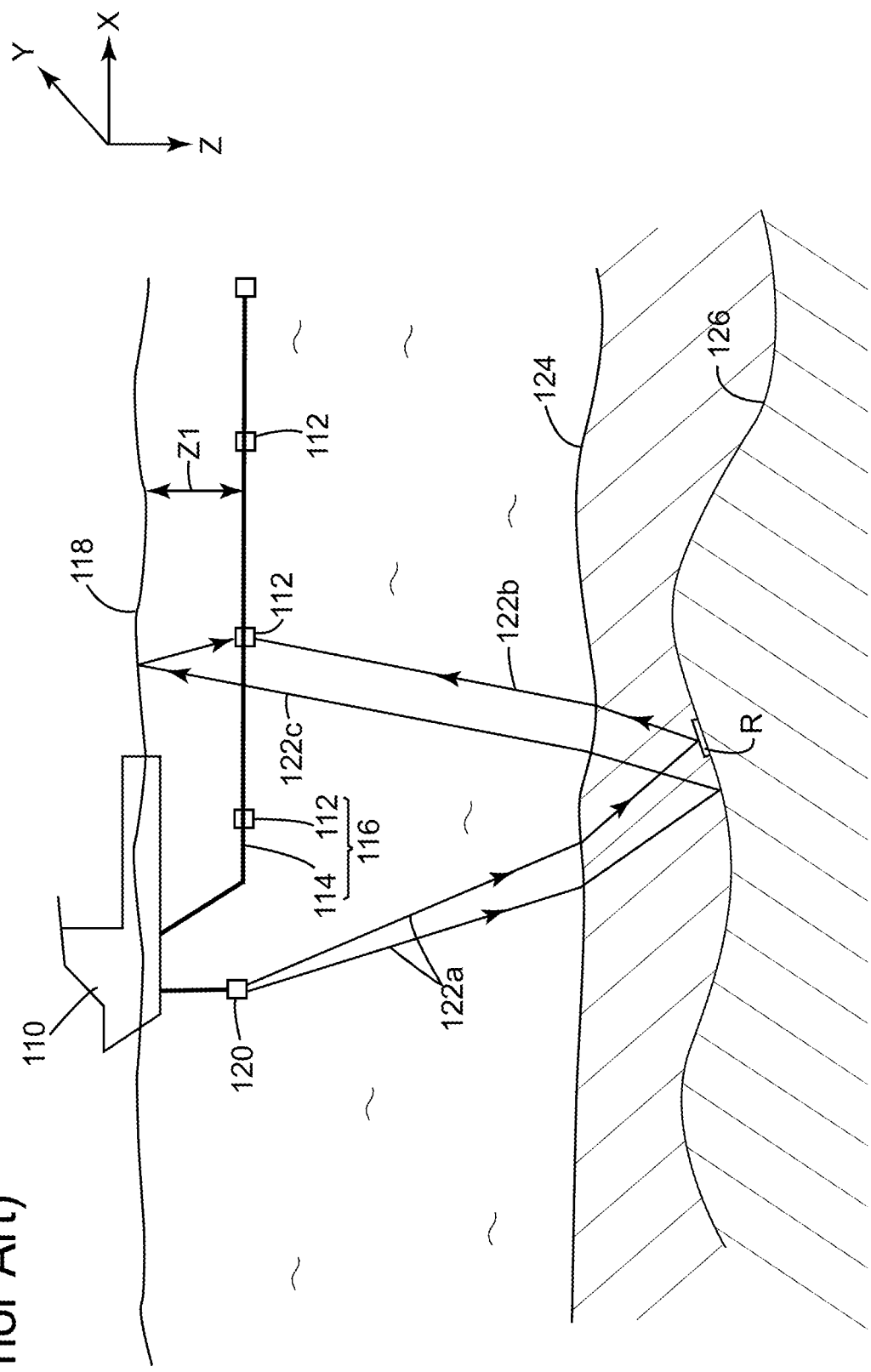
FIG. 1 is a schematic diagram of a conventional seismic data acquisition system having a horizontal streamer.

The extrapolation step is achieved as now described. A possible path of a ghost, for example, the path including 122c and 122d waves in FIG. 1 is considered. The energy of the ghost received and recorded at sensor 112 is back propagated (i.e., extrapolated using, for example, the wave equation or by applying time shifts in the tau-p domain) along path 122d to the water surface 118 and then along path 122c until path 122c intersect streamer 116. At that point, the UP and DW fields in FIG. 4B are obtained, i.e., after backwards extrapolation assuming water surface 118 is flat. Note that as a result of the extrapolating step, both the UP and DW fields are extrapolated as they were not separated as yet, as already discussed above. Further note that FIG. 4C shows a misalignment 406 between the reference timing 408 and the corrected DW field due to the wave's height.

The extrapolation step 300 may be implemented to (a) extrapolate the timing of up-going energy in an attempt to align with the down-going energy of the original data, (b) extrapolate the timing of down-going energy in an attempt to align with the up-going energy of the original data, or (c) extrapolate the timing of up-going energy and the timing of down-going energy in an attempt to better align up-going and down-going energy.

In step 302, the method cross-correlates the up and down aligned data 404 shown in FIG. 4C with the original data 400 shown in FIG. 4A, which results in cross-correlated data 410 having a lag 412 relating to an upward shift of the extrapolated data due to the wave's height. The cross-correlation may be performed in the x-t domain, the tau-p domain, FK domain, or another domain. If the cross-correlation is performed in the tau-p domain, it is possible to take into account the angle of the ray approaching the receiver. A normal cross-correlation or generalized cross-correlation may also be used. The cross-correlation peak may be picked with sub-sample accuracy using polynomial fitting, cubic spline interpolation, etc. Peak picking may be limited to a small time window, e.g., +/−20 ms or less.

In step 304, the wave's height and/or the ghost time shift due to the wave's height are calculated from the cross-correlation data. This step may involve picking/tracking the cross-correlation peak, a method that is known in the art, and thus, not repeated herein. The wave height may be calculated from lag 412 by multiplying it with the speed of sound in water. In one application, the arrival angle of the ghost may be taken into account to more accurately calculate the wave's height. The wave's height may be calculated for each streamer, or for each sensor of each streamer. For example, as will be discussed later, an amplitude of the wave may be calculated and then, together with a wave-length of the wave, a function may be generated that describes the wave along the streamer. In this way, by knowing the exact position of each sensor along the streamer, the height of the wave above each sensor can be calculated from this function. In one application, the function is a simple sinusoid having an amplitude A and a phase phi. The amplitude is calculated as noted above and the phase may be associated with the position of the sensor along the streamer. Other types of waves may be imagined. The sinusoid model of a wave may be used because actual wave height measurements have indicated that these waves have a wavelength of about 100 m and an amplitude of about 2 m.

Figures 5A, 5B, 5C:
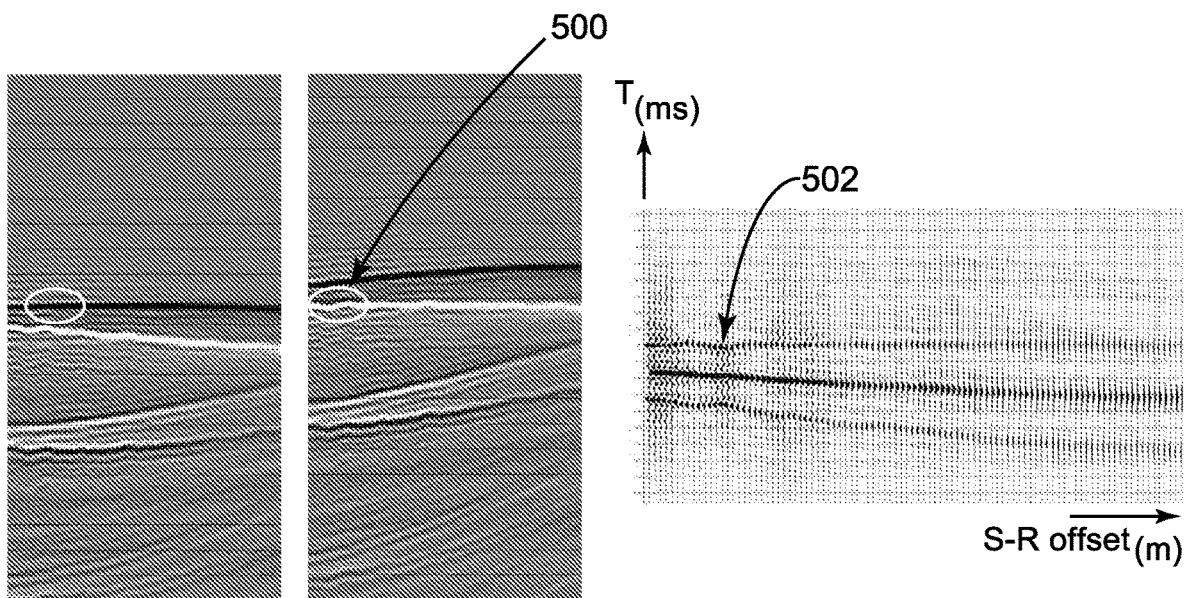
FIGS. 5A-C illustrate how actual seismic data is influenced by the wave height.

FIG. 5A shows real pressure data after extrapolation and flattening based on up-going fields, and FIG. 5B shows the same data after extrapolation and flattening based on down-going fields. The flattening is not a necessary step and has been included here for illustration. Zone 500 indicates the misalignment due to the wave's height. FIG. 5C shows a cross-correlation of data from FIG. 5A with data from FIG. 5B, and the resulting shift 502 relating to wave height around zero lag cross-correlation.

Figure 6:
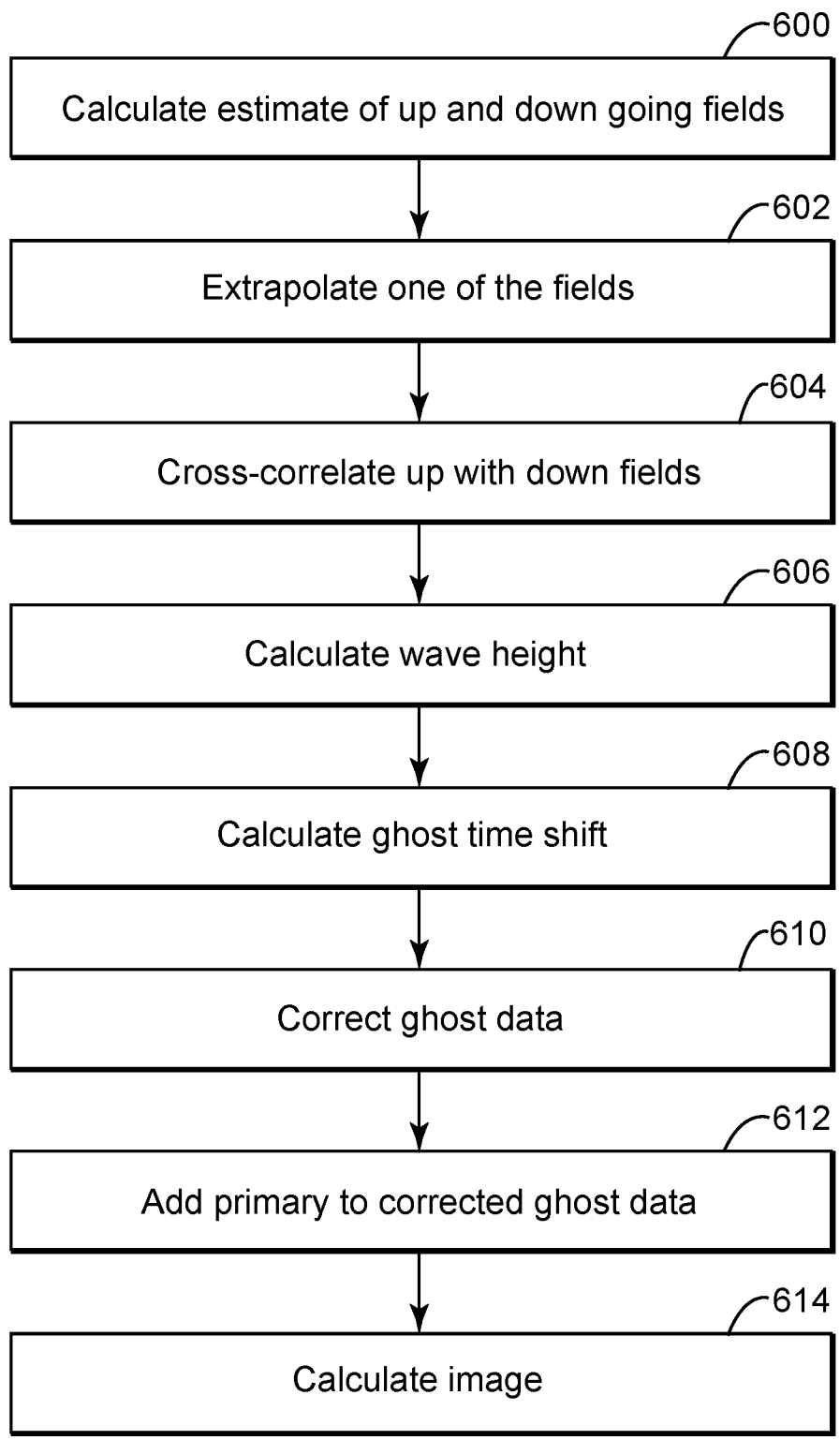
FIG. 6 is a flowchart of another method for calculating the wave height.
Figure 7:
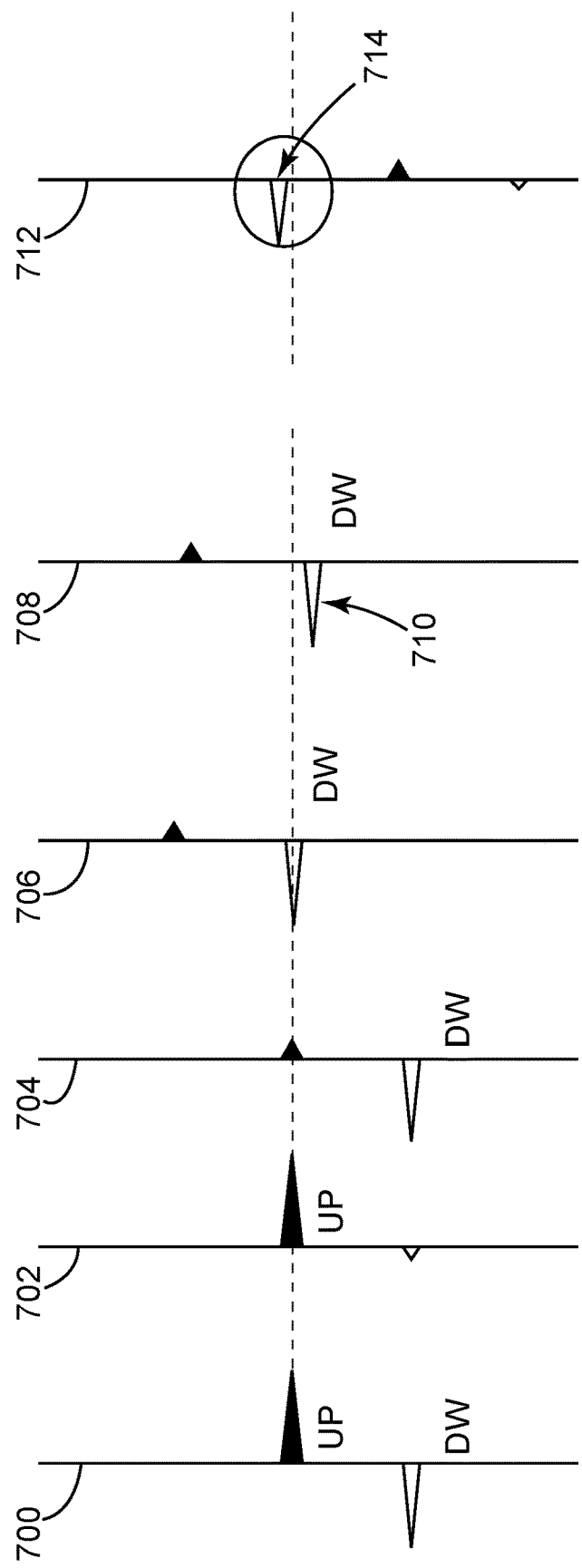
FIGS. 7A-F illustrate the transformation of the seismic data at various steps of the method illustrated in FIG. 6.

According to another embodiment, instead of the cross-correlation approach for calculating the wave's height, a method that uses up-down separation and iterative wave estimation is used to determine the wave's height. According to this method, which is illustrated in FIG. 6, an estimate of up-going and down-going fields is calculated in step 600 using a deghosting method (e.g., Ghost Wavefield Elimination (GWE), disclosed in The Leading Edge, "An efficient 4D processing flow for variable-depth streamer data," p. 171, 2014) based on flat sea surface. Other deghosting methods may be used. The GWE scheme often makes a clean/sparse estimate of up-going and down-going fields, and these fields are subtracted from the input data for deghosting, i.e., UP=hydrophone data—down-going field estimate and DW=hydrophone data—up-going field estimate. FIG. 7A shows the input data (e.g., hydrophone or pressure data, but this data may also be one component particle velocity data collected with accelerometers), FIG. 7B shows the UP data 702 and FIG. 7C shows the DW data 704. Note that in this case, the UP and DW data have largely been separated from each other and for this reason FIGS. 7B and 7C show one of them being large and the other one being almost removed.

In step 602, the DW field 704 is backward extrapolated based on an incorrect flat sea surface resulting in the DW field 708 shown in FIG. 7E, which is similar to the step illustrated in FIG. 4C. Note that FIG. 7E shows a misalignment 710 between UP field 702 and DW field 708, which is indicative of the wave's height.

In step 604, the UP field 702 is cross-correlated with the extrapolated DW field 708, which results in cross-correlated data 712 as shown in FIG. 7F, which has a lag 714 relating to the upward shift of the extrapolated data and it is indicative of the wave's height. Based on this lag, the wave's height is calculated in step 606 and the ghost time shift is calculated in step 608. The wave's height may be calculated, as discussed in the previous embodiment, by multiplying the static shift 714 by the sound velocity in water and dividing the result by 2. In step 610, the ghost data 704 is corrected based on the ghost time shift and in step 612 the primary data 702 is added to the corrected ghost data to obtain the corrected hydrophone data. In step 614, an improved image of the subsurface is calculated based on the corrected hydrophone data. The image of the subsurface is improved at least because the ghost data is corrected to take into account the real sea surface. Steps 600 to 612 may be repeated using the corrected hydrophone data (hydrophone'), as necessary. After each iteration, the up-down separation will improve and allow more accurate wave height estimation. Extrapolation of the down-going field using the correct wave height is given as 706 (FIG. 7D) where the down-going energy has been correctly aligned with the up-going field of FIG. 7A. Instead of correcting ghost data as in step 610, the wave heights calculated in step 606 may be used as basis for a revised calculation of up and down-going fields (step 600) following which the later steps may be re-applied as necessary.

Figure 8:
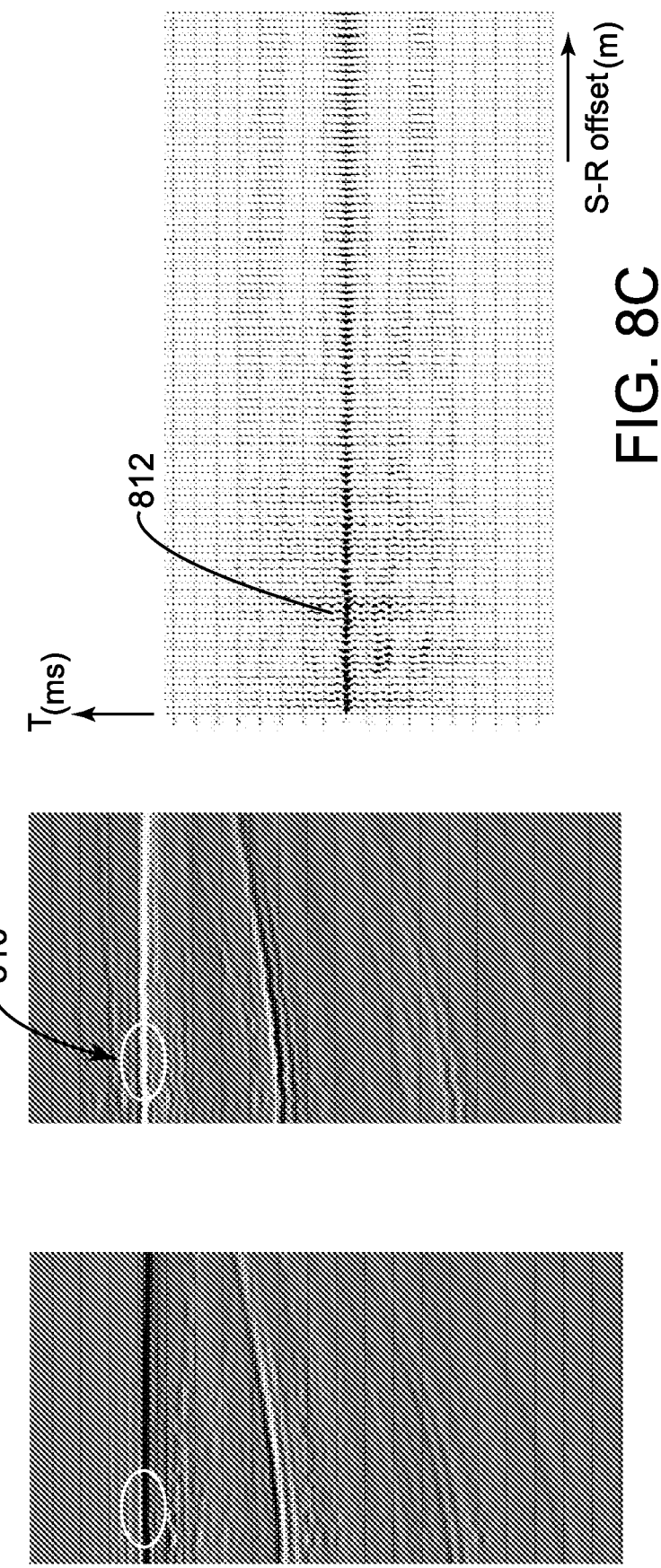
FIGS. 8A-C illustrate how actual seismic data is influenced by the wave height.

FIG. 8A shows separated and aligned UP fields using the GWE method and FIG. 8B shows DW fields separated using GWE and aligned. The misalignment 810 of the DW field is visible in FIG. 8B. FIG. 8C shows the cross-correlation of the data in FIGS. 8A and 8B, with shift 812 relating to the wave's height around zero lag cross-correlation.

Up-down separation of data with non-compensated wave-height timings may result in non-optimal deghosting and less variability in the cross-correlation timings. Data without up-down separation could result in mis-picking, due to the triplication of the energy in the cross-correlation, as illustrated in FIG. 5C. For this reason, in one application, the results of FIG. 8C may be used as a guide to help ghost timing estimation of FIG. 5C data.

Although the examples used here for calculating the wave's height are mainly based on hydrophone data, the algorithms discussed herein are equally applicable to particle movement data (i.e., data collected with accelerometers) or data collected with other type of sensors.

Figure 9:
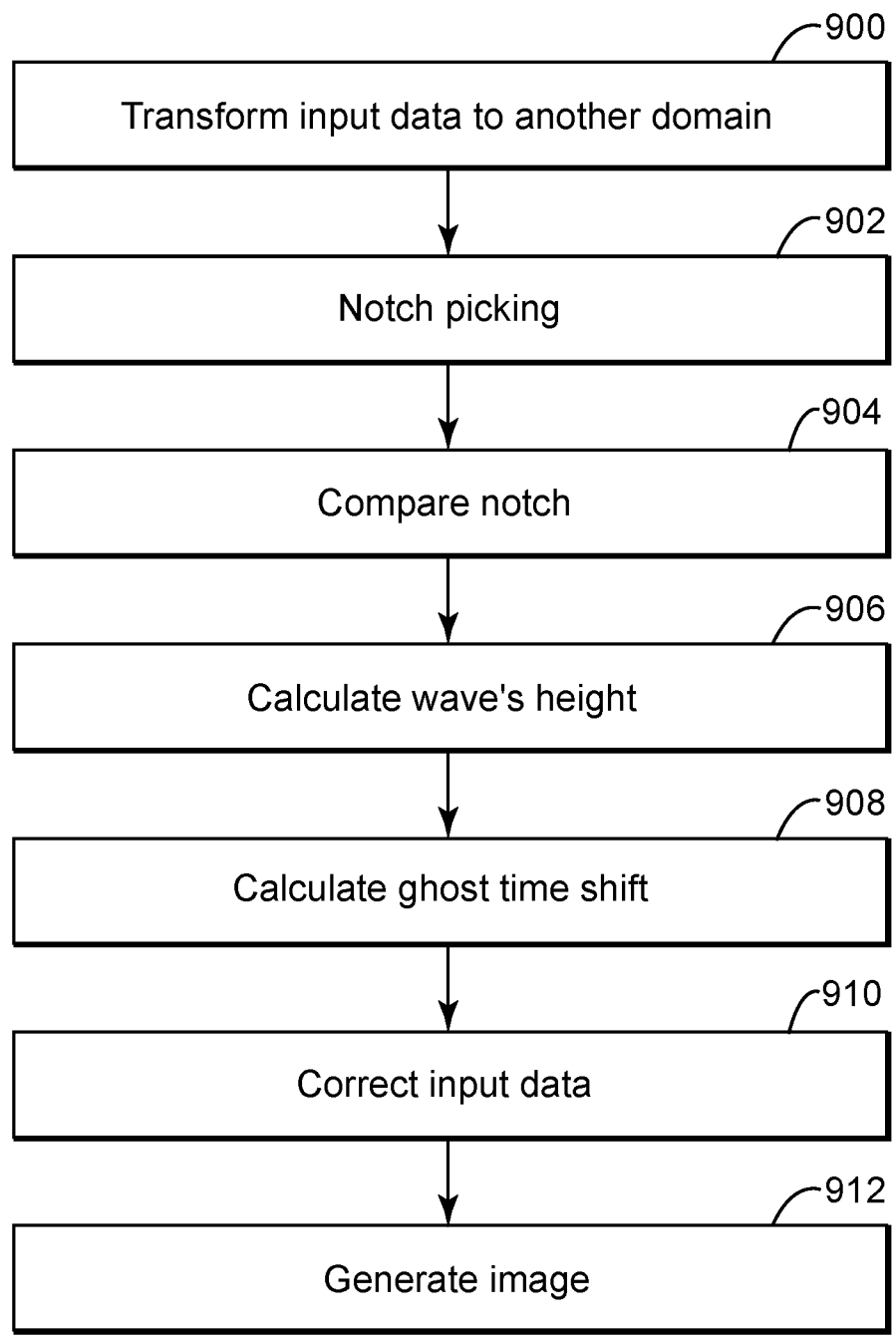
FIG. 9 is a flowchart of still another method for calculating the wave height.

Another method for determining wave's height is now discussed with regard to FIG. 9. This method uses a frequency-domain notch inspection technique. According to this method, the input seismic data (hydrophone-only and/or multi-component data) is transformed in step 900 to the f-x domain (frequency-space) or f-p (frequency-slowness) domain. FIG. 10A shows the input data in the x-t (space-time) being transformed into the f-x domain in FIG. 10B. In step 902, a method of auto-picking the notch is applied. FIG. 10B shows the notch 1002, which deviates from a smooth curve 1004 due to the wave's height. Various algorithms for automatically picking the notch are known in the art and any such method may be used in this step.

In step 904, the picked notch is compared with the averaged f-x domain data illustrated in FIG. 11B, where the ghost notch variation is negligible or reduced. Note that it is also possible to compare the picked notch to a notch calculated based on the sensor depth using analytical equations. Also note that FIG. 11B shows the picked notch 1102 regularly distributed along a smooth curve 1104. The averaged f-x domain in FIG. 11B is obtained by averaging individual spectra from ten shots shown in FIG. 11A. Any number of shots may be used for this averaging operation. The position of the notch in the single spectrum of FIG. 10B varies in frequency, which indicates a variation of the wave height.

In step 906, the wave's height is calculated using the notch position. One way to calculate the ghost time delay follows a bootstrap method disclosed by Wang and Peng, 2012, "Pre-migration deghosting for marine towed streamer data using a bootstrap approach," SEG conference proceedings. No matter how the ghost time delay is computed, the delay time is used in step 908 to compute wave height information (e.g., the difference between the observed ghost delay and expected ghost delay, or the difference between raw ghost delay data and smoothed ghost delay data). This information may then be used in step 910 to correct the input data (the ghost part) after which, an improved image of the surveyed subsurface may be generated in step 912. As an alternative, it is possible to modify the re-ghosting operator rather than correcting the input data.

The methods discussed above for calculating the wave's height were illustrated based on single component seismic data, i.e., seismic data indicative of a single parameter of the subsurface, e.g., pressure or vertical motion, or cross-line motion or inline motion, etc. As discussed earlier, the above embodiments can also be applied to multi-component seismic data, i.e., seismic data indicative of two or more parameters of the wave-field, e.g., pressure and vertical motion, pressure and cross-line motion, or vertical motion and inline motion, etc.

Figure 12:
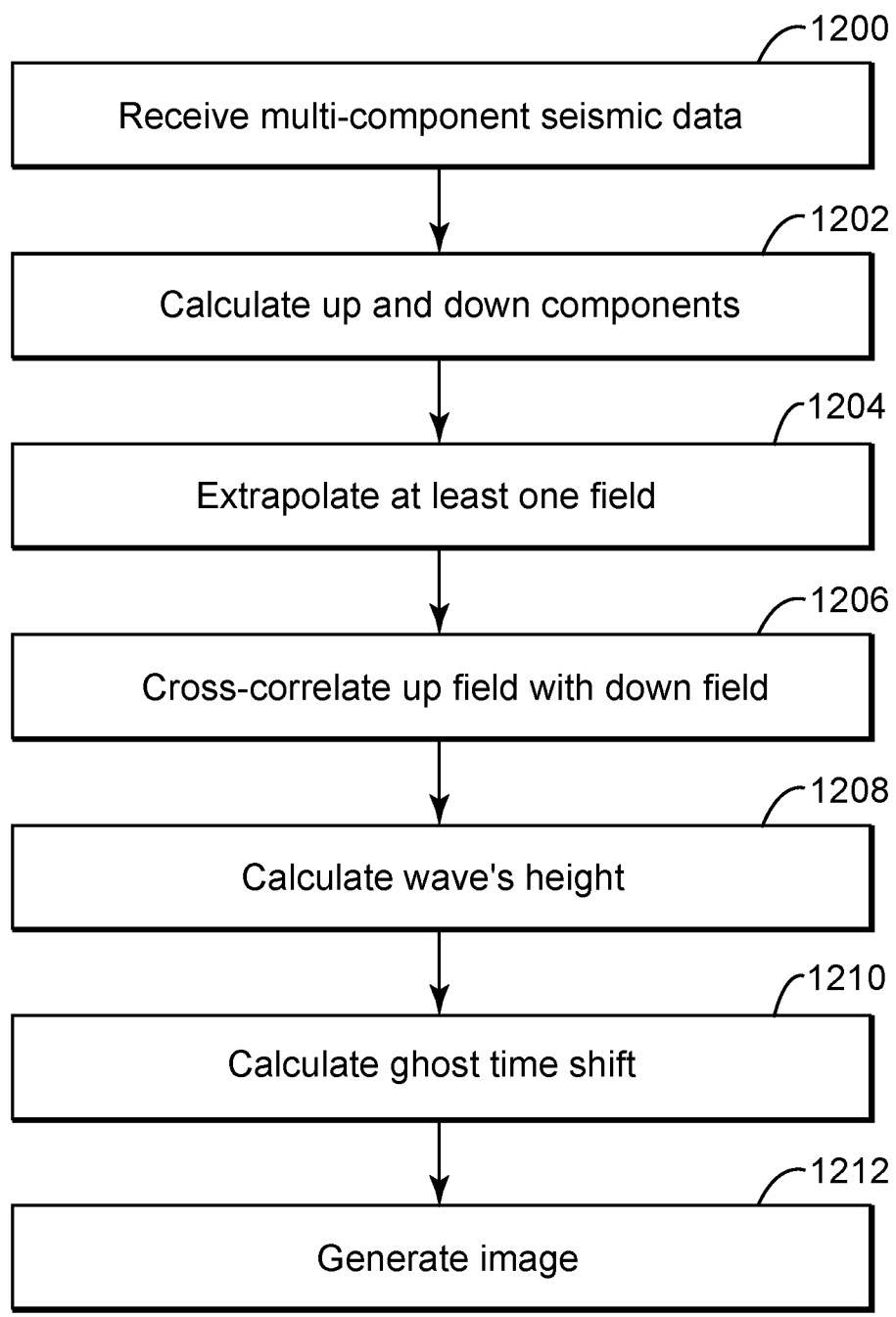
FIG. 12 is a flowchart of yet another method for calculating wave height.
Figure 13:
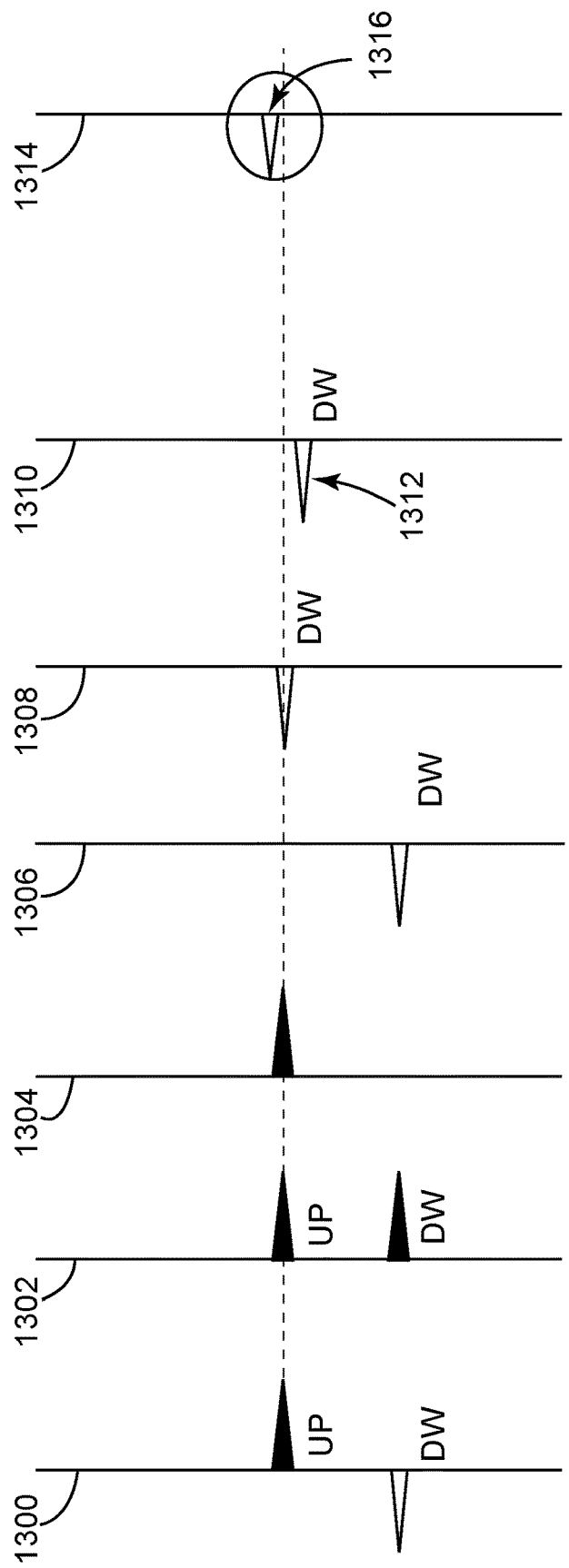
FIGS. 13A-G illustrate the transformation of the seismic data at various steps of the method illustrated in FIG. 12.

This method of determining the wave's height is illustrated in FIG. 12 and it is based on up-down separation of multi-component data and iterative wave height estimation. The method starts with step 1200, in which input seismic data 1300 and 1302 (see FIGS. 13A and 13B) is received indicative of a recording environment exhibiting an unknown wave height. Input seismic data is multi-component data, i.e., it includes pressure data 1300 and vertical particle movement data 1302. Based on the input data, in step 1202, the UP field 1304 and the DW field 1306 (illustrated in FIGS. 13C and 13D) are calculated using, for example, PZ summation and PZ subtraction. In step 1204, the UP and/or DW fields are extrapolated to a consistent timing. The extrapolated DW field 1310 (extrapolated using an incorrect flat sea surface) is shown in FIG. 13F. Note the misalignment 1312 of the extrapolated DW field with the UP field in 1304 due to the wave's height. This relates to an inconsistency between the extrapolation operator, which assumed a flat sea surface, and the recording environment, which included a wave height. This is a similar process to step 602 discussed earlier. The original data recorded UP field 1304 is then cross-correlated in step 1206 with the extrapolated DW field 1310 to generate cross-correlated data 1314. A shift 1316 relating to the wave's height is visible in FIG. 13G. The wave's height is calculated in step 1208 based on the shift 1316, and the ghost time shift is calculated in step 1210 based on the wave's height. In step 1212, an improved image of the subsurface is generated.

In another embodiment, it is possible to estimate the wave's height based on hydrostatic pressure variation captured in sub-seismic frequencies of data (hydrophone-only and/or multicomponent data), e.g., less than 1 Hz.

As discussed above, the above methods for determining the wave's height are calculated per shot. To improve the wave's height stability, it is possible to use data from more than one shot at a time. It is also possible to allow the wave height to vary with time.

Figure 14:
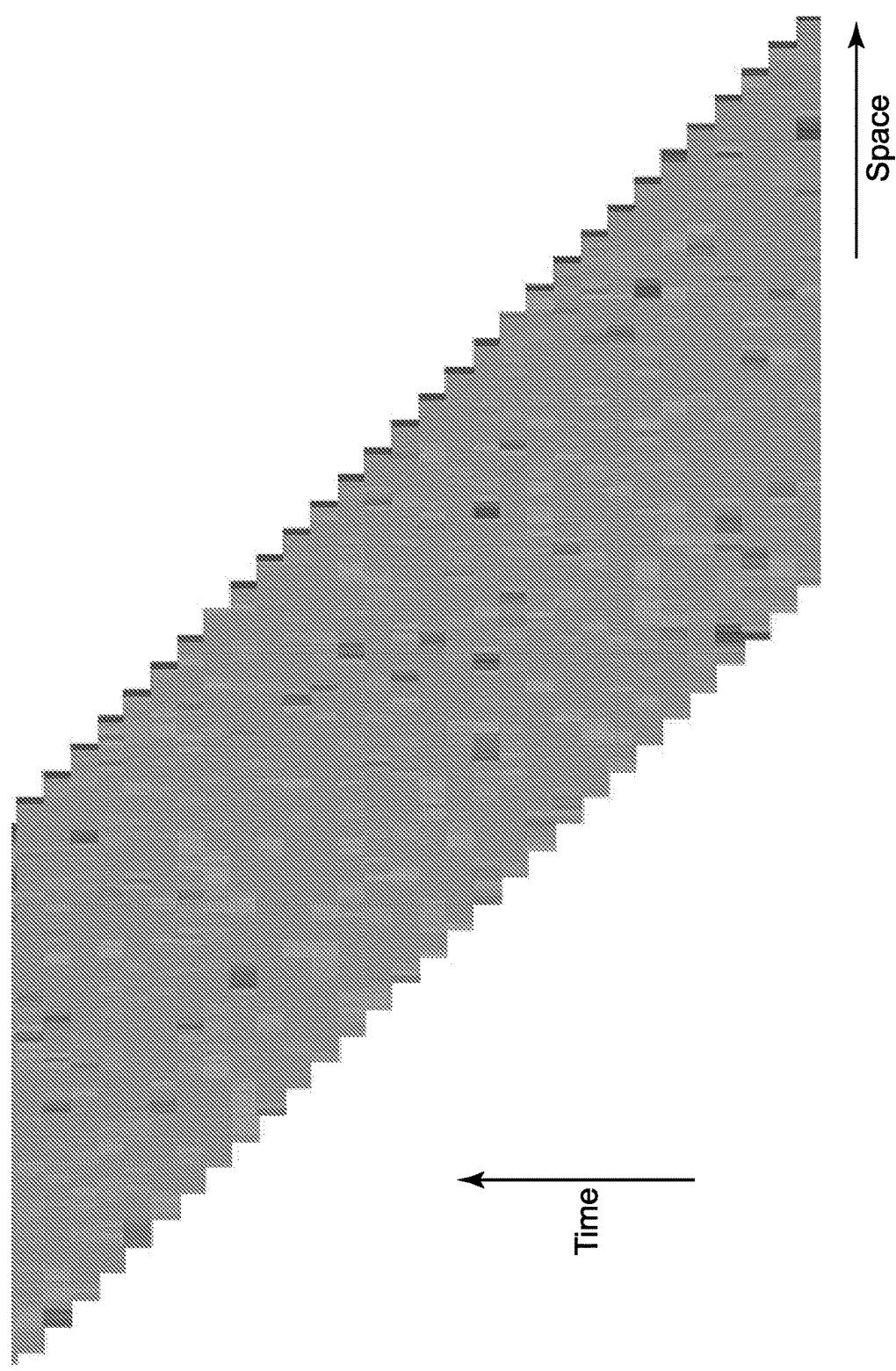
FIG. 14 illustrates the wave height as a function of space and time.

Because picking the ghost timing on a shot-by-shot basis may lead to inconsistent results and mis-picking, one strategy would be to calculate cross-correlations for all shots based on any of the strategies outlined above. The cross-correlations may be considered as a space (i.e., receiver position) time (i.e., Julian time) grid. A surface consistent space-time wave map may be derived, which is simultaneously consistent with all the cross-correlation and/or sub seismic frequency data. The derivation may be based on filtering (e.g., convolution or muting in the frequency domain), smoothing, linear inversion, or non-linear inversion. FIG. 14 shows the wave height as a function of space and time. The light gray indicates positive heights while the dark gray indicates negative heights. Each horizontal row relates to an individual shot.

Note that the data used for estimating the wave height may be processed to make the estimation more successful. This may include muting, frequency filtering, denoising, etc.

The above discussed methods and processes address mostly the calculation of the wave's height, i.e., step 200 of the method illustrated in FIG. 2. Next, some considerations for deghosting the data based on the wave's height are discussed, i.e., step 202 of the method of FIG. 2. As discussed in step 202, there is a sub-step 204 of modifying the data and a sub-step 210 of modifying an operator associated with the deghosting process.

The step 204 of modifying the data is now discussed. This step includes two sub-steps, a first sub-step of shifting the timing of the ghost by the ghost time delays derived as discussed in the previous embodiments, and a second sub-step of recreating the input data (either one component only and/or multi-component) from up-going and shifted down-going fields. More specifically, with regard to FIGS. 7A-F, after the ghost time delay has been calculated based on lag 714, the method shifts the down field 704 with the ghost time delay and then combines the up field 702 with the shifted down field to generate an updated input data. Note that the up and down separation is performed using, for example, GWE or a PZ summation method, and the recreated input data is different from input data 700 due to the ghost time shifting.

Figure 15E:
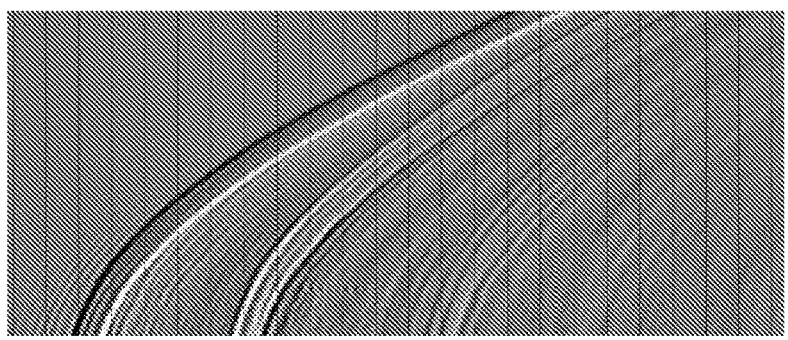
FIGS. 15A-E illustrate how the input data is corrected based on the wave height.
Figure 15D:
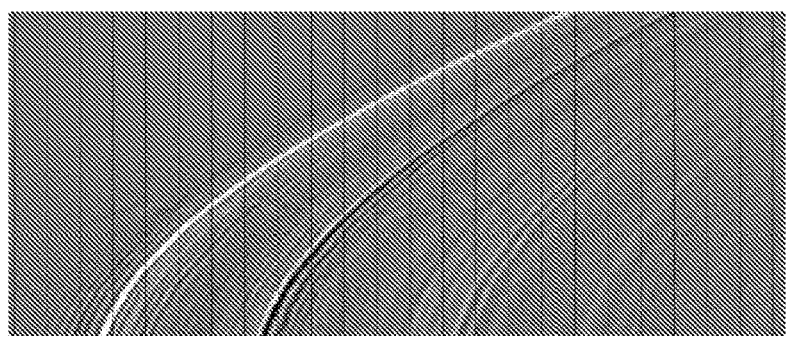
Figure 15C:
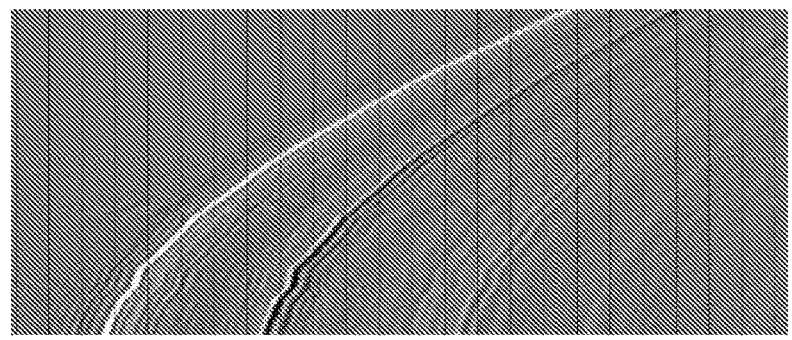
Figure 15B:
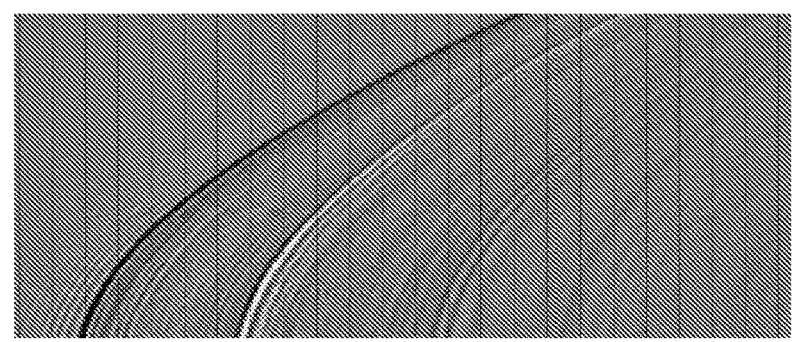
Figure 15A:
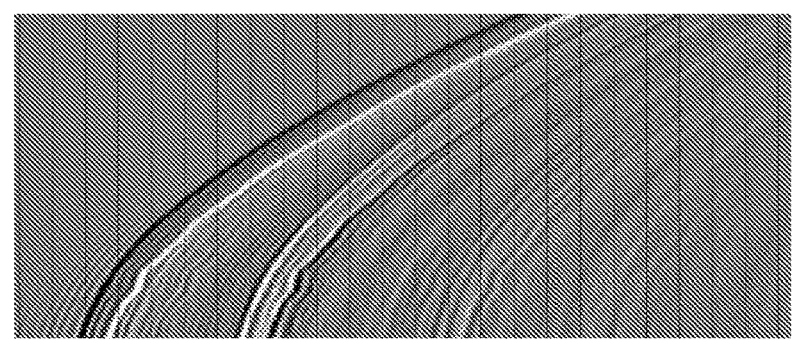

FIG. 15A shows an example of input data that includes pressure waves, FIG. 15B shows the separated UP field, FIG. 15C shows the separated DW field, FIG. 15D shows the corrected DW field and FIG. 15E shows the combined UP field from FIG. 15B with the corrected DW field from FIG. 15D. The corrected pressure data in FIG. 15E represents the updated input data, which is then used for further processing for generating the image of the subsurface.

Step 202 includes a second sub-step 210 of modifying an operator involved in the deghosting process. Sub-step 210 modifies the ghost delay timing relative to the primary in a least squares solver (can also be considered as a Greens function between the streamer and the sea surface). In this sub-step, either single component (e.g., hydrophone or Vz data) only or multi-component data may be used for deghosting.

For a better understanding of this sub-step, a deghosting method that does not take into consideration the wave's height is presented, followed by an adaption of this method for taking into consideration the wave's height.

According to an embodiment, a deghosting method may use a modified representation of a linear least squares Radon algorithm to simultaneously model primary and ghost receiver wave-fields as well as re-datum the wave-fields from the streamer (receiver) to the sea surface or other desired surface. The method assumes that the primary and ghost components are well described by plane waves and uses a tau-p transform to transform the input seismic data. The recorded seismic data includes amplitudes of plural wavelets and associated times for a given frequency spectrum. The tau-p transform is a special case of a Radon transform where input data is decomposed as a series of straight lines in the time-space domain and the straight lines are mapped to points in the tau-p domain. For example, hyperbolic events (e.g., those in shot gathers) in the time-space domain map to elliptical curves in the tau-p domain. This process is referred to as slant-stacking because, to produce the tau-p domain, the input data may be stacked along a series of straight lines.

For each frequency slice (when the recorded seismic data has been transformed into the frequency domain), a standard tau-p transform solves a phase shift equation d=Lp (1). More specifically, considering that d represents the input data for a 2D shot-point gather of n traces for one frequency slide, p is the tau-p model domain containing m slowness traces, and L is the reverse slant stack operator, equation (1) can be rewritten in matrix form as:

$$\begin{pmatrix} d_1 \\ d_2 \\ d_N \end{pmatrix} = \begin{pmatrix} e^{-2\pi i f \tau_{n,m}} \end{pmatrix} \begin{pmatrix} p_1 \\ p_2 \\ p_3 \\ p_M \end{pmatrix}. \quad (2)$$

A time-shift $\tau$ of each matrix element depends on the offset of each trace in meters ($x_n$) and the slowness of the p-trace in seconds/meter ($s_m$) and for this reason only one generic (n,m) matrix element is shown in the matrix L above. The offset of a trace is defined as a distance between a seismic source that shoots seismic waves and a sensor that records the trace, while the slowness is defined as the sine of an incidence angle divided by a speed of the wave fields in water. Thus, the time-shift may be written as $\tau_{n,m}=x_n s_m$. Note that in this model the wave's height is not considered, i.e., the sea surface is considered to be a flat, horizontal, plane.

The above equations are modified to achieve a ghost-free tau-p transform at sea surface datum based on the plane wave propagation properties of the primary and ghost components. In one application, another horizontal datum may be used. In still another application, a slanted, curved, or sinusoidal datum may be used. In this regard, FIG. 16 shows the ray propagation of primary P and ghost G components for a particular slowness and how this ghost-free surface datum data is reverse-transformed, the output traces being generated from separate primary and ghost components.

Figure 16:
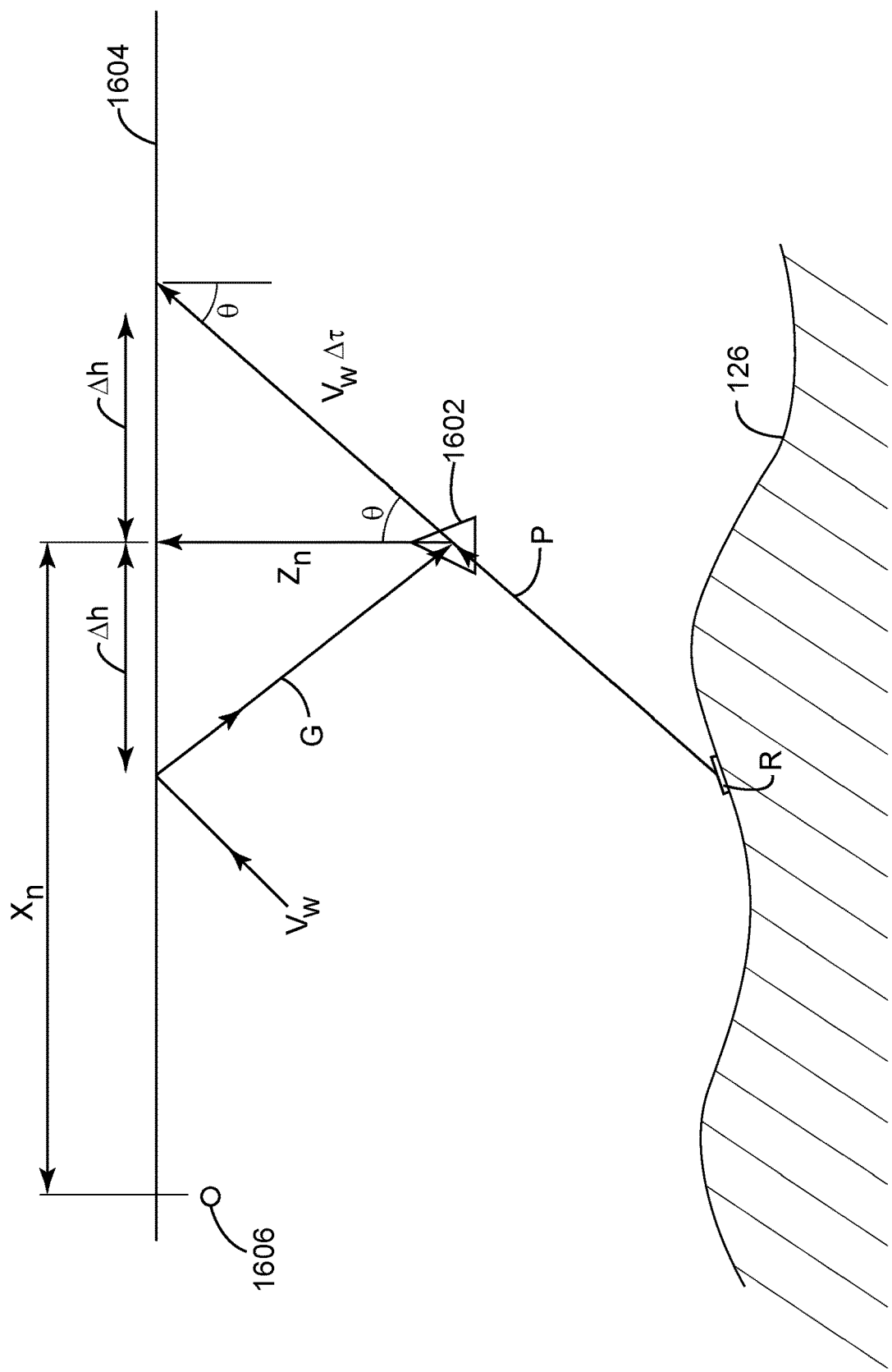
FIG. 16 shows the ray propagation of primary P and ghost G components for a particular slowness with a flat sea surface.

FIG. 16 shows a receiver 1602 having a depth $z_n$ (and other receivers having different or the same depths) relative to the sea surface 1604 and an offset $x_n$ relative to a source 1606. The primary component P is shown arriving at the receiver 1602 from the subsurface R being investigated, while the ghost component G arrives at the receiver 1602 from the flat sea surface 1604. If the path of these two components are traced to the sea surface 1604, then the primary component arrives at a surface datum with an offset longer (with $\Delta h$ in FIG. 16, i.e., $x_n+\Delta h$) than that of the receiver, and the ghost component arrives at the same surface datum with a shorter offset (also $\Delta h$ in FIG. 16, i.e., $x_n-\Delta h$). In addition, the primary component is time advanced by $v_w \Delta \tau$ relative to the surface datum, while the ghost component experiences a time delay of $v_w \Delta \tau$, where $v_w$ is the velocity of sound in water. As discussed above, another datum may be used, in which case, the values of the depths are modified accordingly.

Using trigonometry and the two triangles shown in FIG. 16, the incidence angle $\theta$ (relative to vertical) is given by sin $\theta = s_m v_w$. The delta-offset (for both the primary and the ghost) is given by $\Delta h = z_n \tan \theta$ where $z_n$ is the receiver depth, which may be different for each receiver of a streamer. Finally, the delay time $\Delta \tau$ is given by:

$$\Delta \tau = \frac{\sqrt{z_n^2 + \Delta h^2}}{v_w}. \quad (3)$$

Based on the above equations, the reverse slant stack operator L is modified to contain primary and ghost components. Thus, the modified operator is given by $L_{n,m} = e^{-2\pi i f \tau_{pr}} + Re^{-2\pi i f \tau_{gh}}$, where R is the reflection coefficient at the sea surface (usually −1) and $\tau_{pr}$ and $\tau_{gh}$ are the time delays of the primary and ghost components, respectively. The time delay for the primary component is given by:

$$\tau_{pr} = (x_n + \Delta h) s_m - \Delta \tau \quad (4)$$

while the time delay for the ghost is given by:

$$\tau_{gh} = (x_n - \Delta h) s_m + \Delta \tau \quad (5).$$

The ghost reflectivity in this and other embodiments, R, may vary as a function of frequency, for example, in choppy sea conditions where high frequencies may be scattered relative to low frequencies. In one application, the reflection may take the shape of a Gaussian or 'fuzzy ghost'. Instead of a scalar, the ghost reflectivity, R, may be considered as a convolution operator which encodes the sea surface reflection. The convolution operator, R, may be derived from the data. For example, R may relate to a short adaptive filter to convert primary to wave-height corrected ghost. The primary may have been re-datumed to the timing of the ghost.

At certain frequencies, the above equations may become unstable when the primary and ghost components are approximately equal. For this reason, in one exemplary embodiment, the diagonal of $L^H L$ (where $L^H$ is the Hermittian (conjugate and transpose) of L) is damped or the component of L can be replaced with only the primary component. Alternatively, a limit in amplitude boosting may be imposed whilst still applying full phase deghosting.

While the notation here describes the process in the temporal frequency domain (working independently on frequency slices), the method may also be applied in the time domain. The method may be applied on the whole shot, mid-point, common-channel or receiver gather or in overlapping spatial and/or temporal windows. In addition, it may be useful to include sparseness weights as with many high resolution algorithms. Sparseness weights may be iteratively recalculated (iteratively re-weighted least squares inversion). The weights may first be designed on a model derived from a high cut version of the data, thus steering the higher frequencies of the transform domain to their true un-aliased position. Sparse inversion may also be known as high resolution Radon. Model domain sparseness weights may be set to zero for trace segments or whole traces to reduce the degrees of freedom in the model domain. This may be beneficial when the number of input traces is significantly higher than the number of model traces. In addition, data domain sparseness weights may be used based on varying noise levels in the input data.

Having measured d, the tau-p model domain p may be calculated using operator L. In one application, equation (2) may be solved using least squares inversion, e.g., Choletsky factorization, LU decomposition, conjugate gradients, etc. The resulting tau-p model domain p (or transform) can then be reverse-transformed to generate the shot gather. In one exemplary embodiment, the tau-p model domain p is reverse-transformed with linear operator $L_{n,m}=e^{-2\pi i f \tau_{pr}}$ to remove the ghost and leave data at original datum. In another exemplary embodiment, the tau-p model domain p is reverse-transformed with operator $L_{n,m}=e^{-2\pi i f x_n s_m}$ to remove the ghost and output the data at zero datum (i.e., deghosting and redatuming). In still another exemplary embodiment, the tau-p model domain p is reverse-transformed to re-datum with or without re-ghost to a user-defined datum. This may be achieved by applying a modified linear operator to the model derived by the inversion. The modified linear operator may be based on the required positions for the output data.

The process may be thought of as two steps. In the first step, a model domain p is derived from input data using a transfer matrix representing the primary terms, $L_{primary}$, ghost terms, $L_{ghost}$, or primary and ghost terms, $L_{primary+ghost}$ (first step). Note that the input data may include only primary, only ghost, or both of them. The model domain p is then used in the second step to generate the output data which may also be primary, ghost, or primary and ghost, re-datumed or not. The operators associated with the model domain p may be at the same datum as the input data (data on which the operators are applied) or at a new datum ($L_{primary}'$, $L_{ghost}'$, and $L_{primary+ghost}'$ respectively). In other words, the up-going energy and/or the down-going energy may be representative of the wavefield at hypothetical receiver positions, not at a position of any input trace. In one application, the input data is d, the model domain is p and the transfer matrix is L, when using the notations associated with equation (1). These steps are summarized as follows:

For deghosting—if the datum is left unchanged and the input data contains primary and ghost energy, determine a model domain p (first step), using for example, $L_{primary+ghost}$ to derive a primary model space (input data for the second step) and then apply $L_{primary}$ to the model domain to obtain as output data the primary;

Alternatively, for deghosting in the case the datum is left unchanged and the input data contains primary and ghost energy, determine a model domain p (first step), using for example, $L_{primary+ghost}$ to derive a primary model space (input data for the second step), apply $L_{ghost}$ to the model domain to obtain as output data the ghost, and subtract the ghost from the original input data to provide deghosting;

To deghost and if the datum is to be changed when the input data contains primary and ghost energy, determine (first step), for example, $L_{primary+ghost}$ to obtain a primary model domain (input data for the second step) and then apply $L_{primary}'$ to the model domain to redatum and output only primary data;

For reghosting, where the input contains only primary data—if the datum is left unchanged, determine (first step), for example, $L_{primary}$ to obtain the primary model domain (input data for the second step) and then apply $L_{primary+ghost}$ to the model domain to obtain as output data for the primary and ghost;

For reghosting, if the datum is to be changed and the input contains only primary energy, determine (first step), for example, $L_{primary}$ to obtain a model domain of the primary data (input data for the second step) and then apply $L_{primary+ghost}'$ to the model domain to redatum and reghost;

For redatuming, it is possible to modify the ghost timing based on the new datum, e.g., determine (first step), $L_{primary}$ to obtain a model domain containing only primary energy (input data for the second step) and then apply $L_{primary+ghost}'$ to redatum and re-ghost.

Still for the redatuming, where the input contains primary and ghost energy, it is also possible to deghost at the same time, e.g., determine (first step) $L_{primary+ghost}$ to obtain a model domain containing primary and ghost energy (input data for the second step) and then apply $L_{primary}'$ to generate the output (deghosted data) at a designed datum.

Note that for the first step one or more operators are used while for the second step the same or different operators may be used, i.e., operators that are redatumed.

While the above descriptions have been limited to re-datuming and wavefield separation, data interpolation or regularization may optionally be applied. This may be achieved by applying a modified linear operator to the model derived by the inversion. The modified linear operator may be based on the required positions for the output data.

The user defined datum may be representative of a horizontal streamer or a different cable shape. This can be of particular use for time lapse processing projects. In this case, the time delays $\tau_{pr}$ and $\tau_{gh}$ are recalculated based on the user-defined datum required for output (e.g. alternative vintage for a timelapse project). Alternatively, the method may be used to output on the positions of receivers (x,y) from an earlier acquisition. Output with modified datum (z) and spatial positioning (x,y) may be used in combination.

While the above-discussed embodiments assume a 2D propagation of the wave-fields, the equations can be extended to 3D where the slowness in the offset-x and offset-y directions are used. The 3D implementation may work on all streamers from a full 3D shot (or 'super-shot' in the case of wide-azimuth data) or a limited subset of streamers so that it has access to offsets in the x- and y-directions. In addition, the method may work on a 'super-shot,' where a shot point has been repeated for a number of sail line passes; for example, in a wide-azimuth towed streamer acquisition. In addition to the embodiments of wavefield separation and/or re-datuming, the output may also be at a position in between the streamers.

Figure 17:
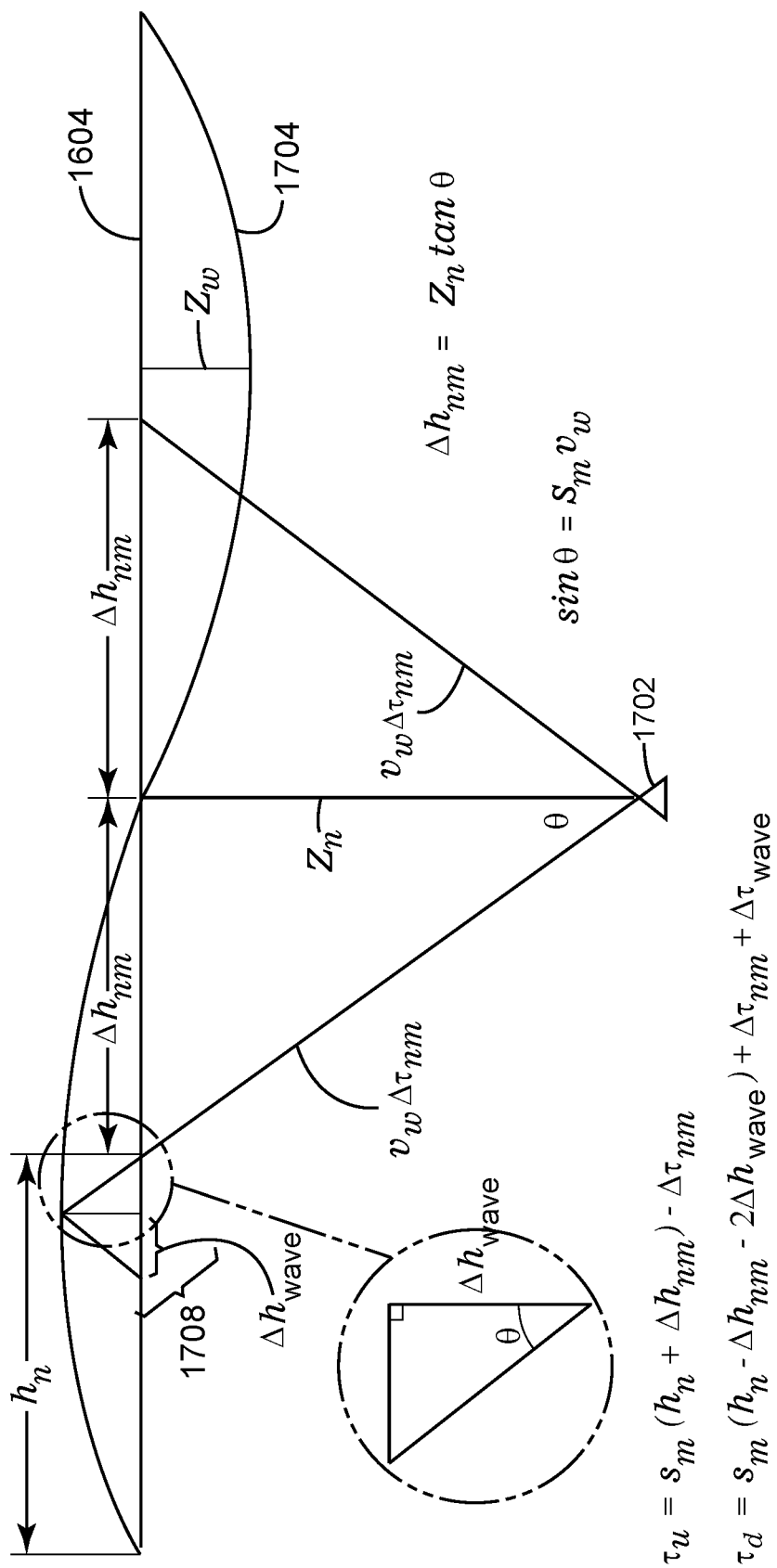
FIG. 17 shows the ray propagation of primary P and ghost G components for a particular slowness with a real sea surface.

The above described deghosting method is now modified to take into account the wave's height. This means that instead of having a flat sea surface 1604 as illustrated in FIG. 16, the actual sea surface's shape 1704 is taken into account, as illustrated in FIG. 17. This shape is described as a wave.

The Green's function and/or time shift linear operators L related to the down-going wave-field discussed above are modified to account for the ghost time delays calculated in step 200. The deghosting scheme may be related to single component (e.g., hydrophone-only) and/or multicomponent data. The time delays calculated in equations (4) and (5) above, for the primary and ghost fields, are now modified to take into account the wave's height. FIG. 17 shows a sensor 1702 that is at a depth $z_n$ relative to a flat sea surface 1604. The flat sea surface 1604 corresponds to a reference plane for the wave 1704.

With the arrangement illustrated in FIG. 17, and considering that $h_n$ is offset between a source (not shown) and sensor 1702, the time delay for the primary becomes:

$$\tau_{pr}=(h_n+\Delta h_{nm})s_m-\Delta\tau_{nm} \qquad (6)$$

and the time delay for the ghost becomes:

$$\tau_{gh} = (h_n - \Delta h_{nm} - \Delta h_{wave})s_m + \Delta \tau_{nm} + \Delta \tau_{wave}, \quad (7)$$

where $\Delta \tau_{nm}$ is the travel time of the ghost from a horizontal water surface 1704 to the sensor 1702 for trace n and slowness m, $\Delta h_{wave}$ is the distance traveled by the down-going wave field along plane 1604 due to the wave's height, and $\Delta \tau_{wave}$ is the time delay introduced by the water's height. Path 1708 is the extra path for the down-going field that is introduced by the wave's height.

According to this algorithm, it is possible for each sensor and each slowness to calculate $\Delta h_{n,m} = z_n \tan \theta$ using $\sin \theta = s_m v_w$ as per the case with no wave height illustrated in FIG. 16. Then, in a next step, the process finds the input trace with offset as close as possible to $\Delta h - 2\Delta h_{wave}$. After this step, additional wave based terms are calculated as follows:

$$z_w = \text{wave height} \quad (8)$$

$$\Delta h_{wave} = z_w \tan \theta \quad (9)$$

$$\Delta \tau_{wave} = \frac{\sqrt{z_w^2 + (2\Delta h_{wave})^2}}{v_w}. \quad (10)$$

The ghost time delay can now be calculated by substituting equations (9) and (10) in equation (7), and the ghost time delay is substituted in operator $L_{n,m}$ discussed above. Thus, this is one possible implementation of the step 210 of modifying the operator used in the deghosting scheme. Note that in this embodiment, the wave's height does not affect the primary, only the ghost.

The method discussed above illustrates one way of modifying the deghosting operator. According to another embodiment, primary (up-going) and ghost (down-going) timings may be calculated as follows:

$$\tau_{pr} = s_x(m)h(n) - s_z(m)z(n) \quad (11)$$

$$\tau_{gh} = s_x(m)h(n) + s_z(m)(z(n) + 2z_w(n)) \quad (12)$$

and:

$$\frac{1}{v_w^2} = s_x(m)^2 + s_z(m)^2 \quad (13)$$

where:
$s_x(m)$—is the slowness in x-direction (s/m);
$h(n)$—is a trace offset (m);
$z(n)$—is a trace depth (m) from the water surface;
$w(n)$—is the wave's height where ghost ray reflects (m) from the water surface;
$s_z(m)$—is the slowness in z-direction (s/m); and
$v_w^2$—is the water velocity between the sensor and the sea surface (m/s).

Figures 18A, 18B, 18C:
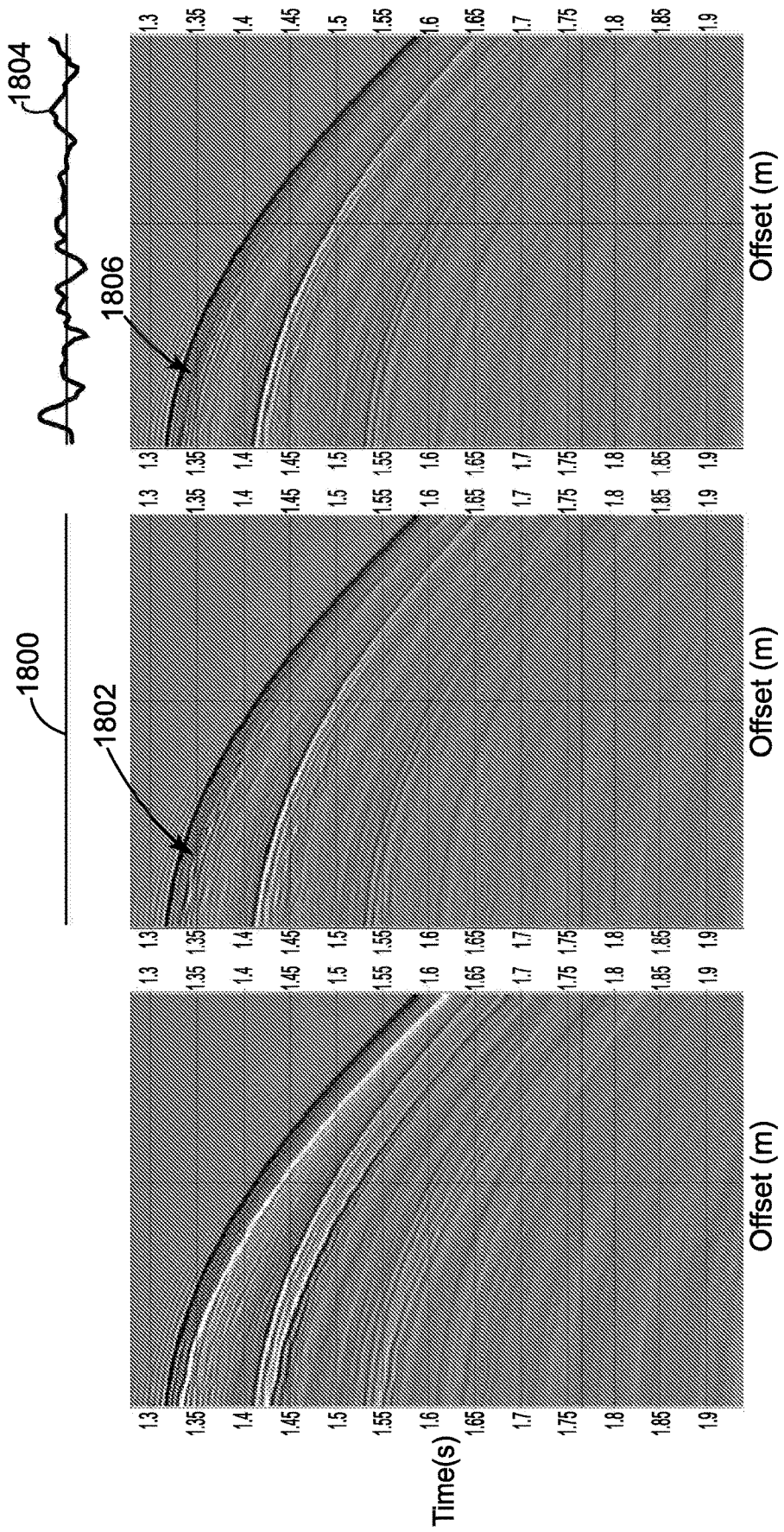
FIGS. 18A-C show real data processed with wave height adjustment.
Figure 19:
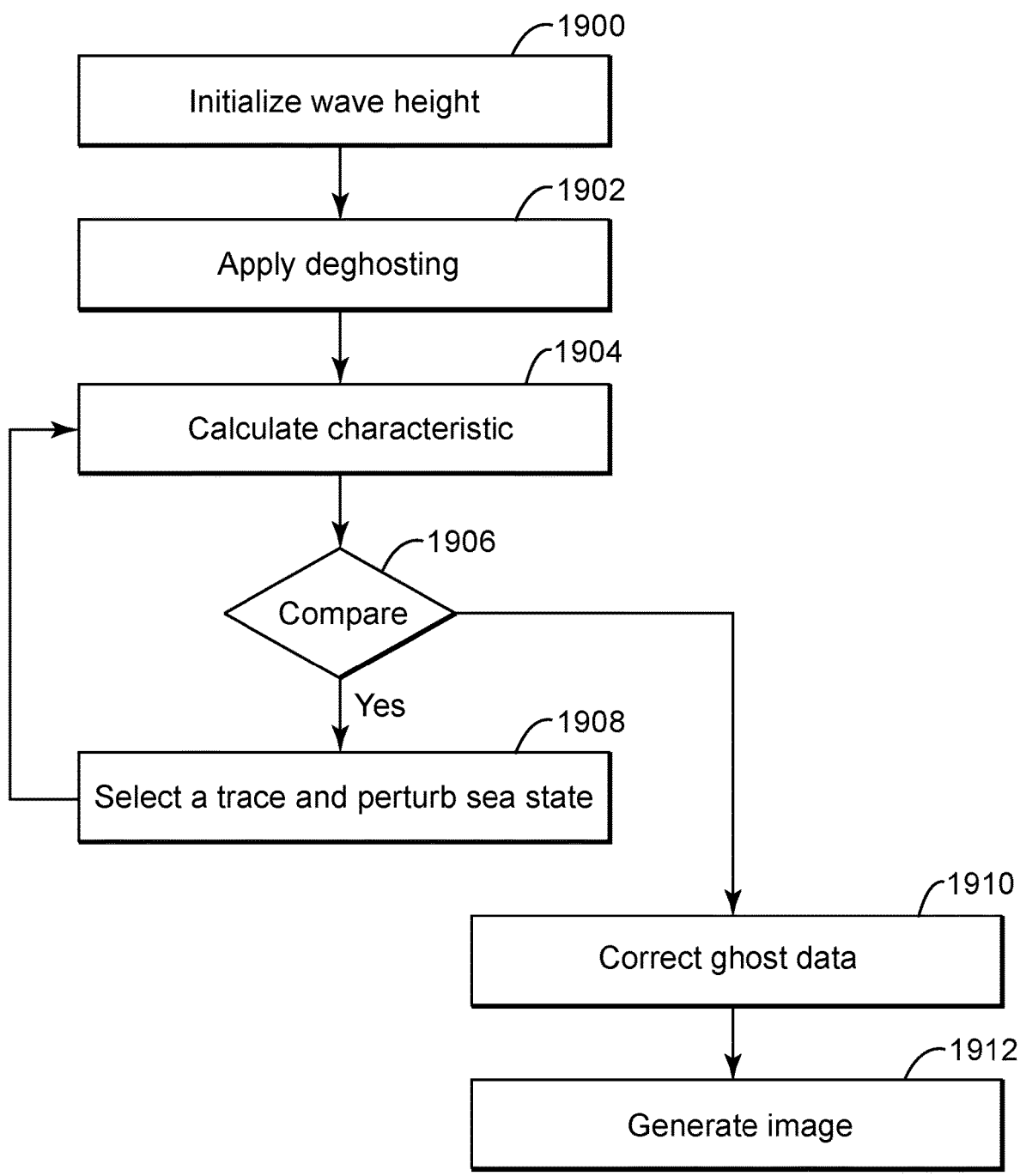
FIG. 19 is a flowchart of a method for simultaneously calculating the wave's height and deghosting seismic data according to an embodiment.

The results of applying such a modified operator to the GWE method with wave height adjustment are illustrated in FIGS. 18A-C. FIG. 18A shows the input data, FIG. 18B shows the GWE processed data with no height adjustment 1800 (note the residual ghost 1802 due to wave height variations that affect ghost timing) and FIG. 18C shows the GWE processed data with height adjustment 1804 (note the reduction in the residual ghost energy 1806 due to wave height being respected in the inversion).

Figure 21:
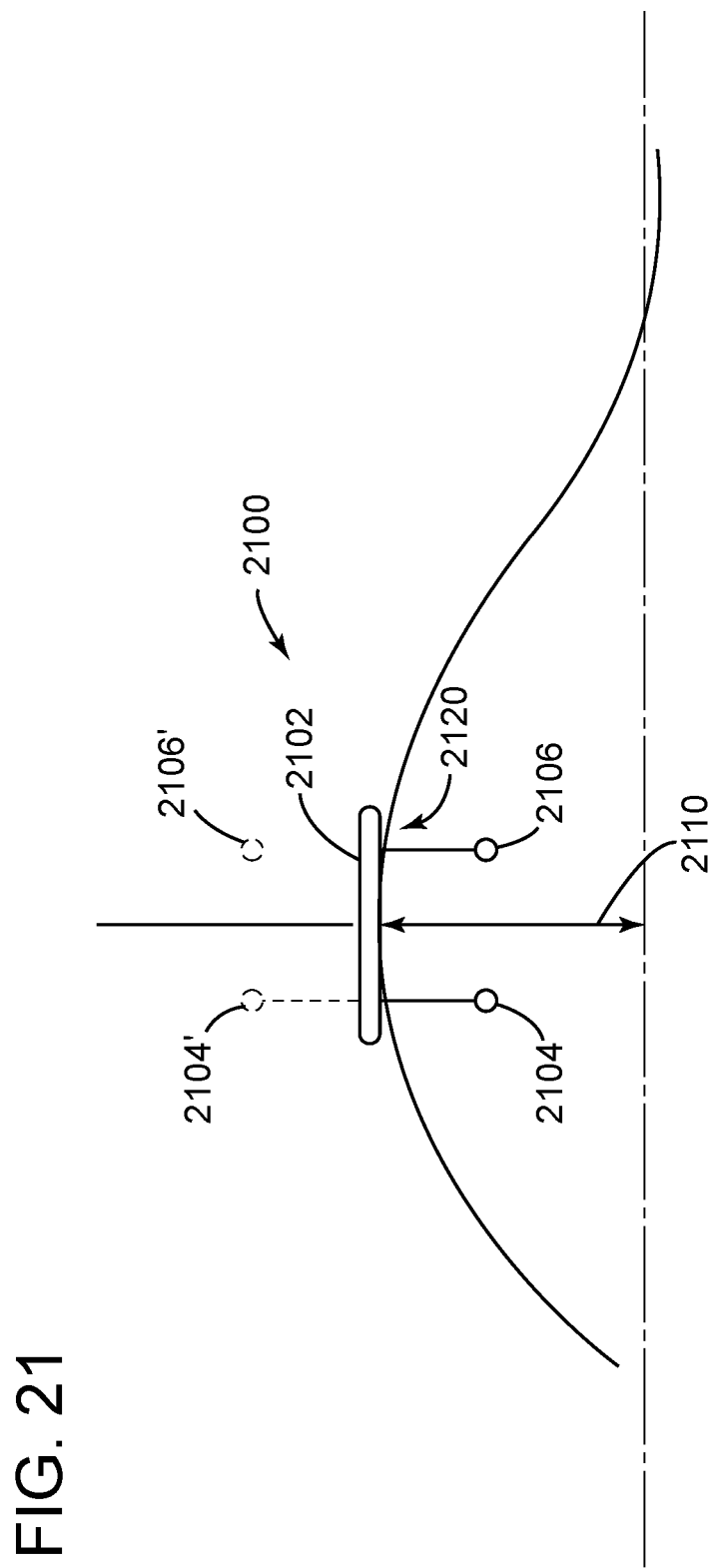
FIG. 21 illustrates the movement of a source with the water surface.

The above discussed methods may be adapted to correct for wave height variations above the source, for example, by working in the receiver domain from which a tau-p domain would represent source take-off angles. In the case that the source 2100 is at a fixed distance from the sea surface, for example, suspended by floats 2102 as illustrated in FIG. 21, the source ghost timing may not vary. FIG. 21 shows source 2100 having two source elements 2104 and 2106 suspended from float 2012. Nevertheless, in this case, the wave height from float 2110 variation may manifest itself as a change in source datum, from shot to shot, which may be corrected using a similar strategy to one of the approaches discussed above. This means that while the vertical distance between the source elements 2104 and 2106 and the mirror source elements 2104' and 2106' may be fixed, the datum 2120 of the free surface may vary from shot to shot. This correction may also be adapted to compensate for the source signature.

A wave height term can be introduced for the source side as follows. Updating equations (11) and (12) for the case illustrated in FIG. 21, it is found that:

$$\tau_{pr} = s_x(m)h(n) - s_z(m)z(n) + s_z(m)z_w(n), \text{ and}$$

$$\tau_{gh} = s_x(m)h(n) + s_z(m)z(n) + s_z(m)z_w(n).$$

In the case it is not desired to compensate for the source ghost, the reflection coefficient, R, introduced earlier, may be zero. In this case, the middle term based on the source depth may not be required. In the case that a source is composed of a number of elements (e.g., airguns), each with a known output (e.g., notional source data computed from nearfield hydrophone measurements), it is possible to simultaneously consider the source ghost and emission signature (including bubble, source array, and gun response). This approach sums the contribution from each notional source as described for a horizontal sea surface in U.S. patent application publication no. 2014/0043,936 and Poole, G. et al., 2013, "Shot-to-shot directional designature using near-field hydrophone data," SEG conference proceedings, and may be adapted for a variable sea surface following the previous discussion. The source elements (e.g., airguns) may all be at the same depth or may be at different depths. This may allow application of source re-datum, interpolation, regularisation, wave-field separation, denoise, re-signature (for example simulating a signal leaving a different source array), or a combination thereof.

In some circumstances, wave height values for the source may not be calculated using analysis of the ghost timing which as discussed, may be constant. In this case, it is possible to estimate the source height either using direct measurements (e.g., GPS, etc.) or by data analysis, if timing variations from shot to shot. This may include filtering data (e.g., filter common channel data with an fx prediction filter), cross-correlating data before and after application of the filter, and using the cross-correlation peak to estimate a shot-to-shot timing variation attributed to wave height variations.

Simultaneous correction of source and receiver sides for a flat sea surface is described in International Patent Application WO/2015/011160A1 (for example in the tau-$p_{shot}$-$p_{receiver}$ domain). The equations from this reference may be updated using a non-horizontal sea surface following the discussion presented herein.

The methods discussed may be implemented in 1D, 2D, or 3D using the notation chosen by any of the references given below. The equations may use a single component or jointly use multi-components, for example, as disclosed in Poole, G., 2014, "Wavefield separation using hydrophone and particle velocity components with arbitrary orientation," SEG 2014 Annual Meeting, Expanded Abstracts. In this case, a model (e.g., tau-p) of the data may be derived to simultaneously satisfy recordings from more than one kind of sensor at the same time (e.g., hydrophones and accelerometers). The solver may be in the time or frequency domain and use data and/or model domain sparseness weights as described earlier.

The use of wave-height data in this way may be used to expand the formulations of any wave-field separation method (e.g., separation of primary and ghost) to include interpolation, re-datuming, source separation, or demultiple etc. The approach may also be used to re-code data based on any of these applications, for example, by adding a ghost based on the wave height from a second survey or encoding multiples based on a wave height from a second survey.

Modified ghost timings may be based on vertical timings or based on the slowness of each model ray. The wave height may relate to the height above the sensor, or at the point the ray intersects the sea surface.

The features discussed in these embodiments are applicable to any of the existing deghosting and/or demultiple methods. Some deghosting methods that are good candidates for these features are as follows:

Poole, G., 2013, "Pre-migration receiver de-ghosting and re-datuming for variable depth streamer data," SEG 2013 Annual Meeting, Expanded Abstracts 29, 3406-3410;

Poole, G., 2014, "Wavefield separation using hydrophone and particle velocity components with arbitrary orientation," SEG 2014 Annual Meeting, Expanded Abstracts;

Poole, G., Patent application publication no. US 2013/0163376 & CIP;

Poole, G., Patent Application Publication Nos.: US 2013-0163379 and US 2013-0163376, and patent application Ser. No. 14/678,099;

Poole, G. et al., International Patent Application No. PCT/IB2015/000784;

Poole, G., Davison, C., Deeds, J., Davies K., and Hampson, G., 2013, Shot-to-shot directional designature using near-field hydrophone data, SEG conference proceedings;

Poole, G., Cooper, J., King, S., and Wang, P., 2015, 3D source designature using source-receiver symmetry in the shot tau-px-py domain, EAGE conference proceedings;

Poole, G., and King, S., Demultiple using up/down separation of towed variable-depth streamer data, U.S. patent application publication 2015/0109881;

Wang et al., 2014, "Joint hydrophone and accelerometer receiver deghosting using sparse tau-p inversion," SEG 2014 expanded abstracts;

Wang et al., 2014, "3D joint deghosting and crossline interpolation for marine single-component streamer data," SEG 2014 expanded abstracts;

Wang et al., 2013, "Pre-migration deghosting for marine streamer data using a bootstrap approach in Tau-P domain," SEG Conference and proceedings; and Wang and Peng, 2012, "Pre-migration deghosting for marine towed streamer data using a bootstrap approach," SEG conference proceedings.

Many of the strategies discussed above derive the ghost free model of the data in the tau-p domain. However, other domains may be used. An example in the parabolic domain may relate to a move-out term based on parabolic move-out and a re-ghosting term based on the linear slope relating to the parabola at a given offset and this is described by:

$$d(n)=L(n,m)r(m) \quad (14)$$

where:

d(n)—is the vector of input data in the frequency domain;

r(m)—is the vector of model data in the parabolic Radon space;

L(n,m)—is a linear operator.

Operator L in equation (14) can be rewritten based on equations (11)-(13) as follows:

$$L(n,m)=e^{2\pi i f \Delta t(n,m)}(e^{2\pi i f s_z(n,m)z(n)}+Re^{-2\pi i f s_z(n,m)z(n)}), \quad (15)$$

where the time delay Δt(n,m) is given by:

$$\Delta t(n,m)=q(m)x(n)^2, \quad (16)$$

the slowness in the X-direction is given by the derivative of the time delay Δt along X-direction:

$$s_x(n, m) = \frac{d\Delta t}{dx} = 2q(m)x(n), \quad (17)$$

and the speed of sound in water is related to the slowness in the X and Z-directions as follows:

$$\frac{1}{v_w^2} = s_x(n, m)^2 + s_z(n, m)^2, \quad (18)$$

where q in equation (17) is a parabolic move-out having the units of time over square meter. This scheme may be adopted in 2D or in 3D and for any of the purposes described in the above references. As an alternative, it is possible to consider a shifted apex parabolic Radon domain, where the Radon model is now three-dimensional based not only on parabolic moveout, but also the parabolic apex offset. In this case it is possible to define Δt(n, m) as:

$$\Delta t(n,\underline{m})=q(\underline{m})(x(n)-x_{ref}(\underline{m}))^2$$

In this case, m may be a two dimensional model parameter index relating to a first model dimension being a parabola index and a second model dimension being the apex position index (referencing an offset in meters through vector $x_{ref}$). In this case, the differentiation in equation (17) should also be updated. While these parabolic Radon formulations are given for the case of a flat sea surface, they may be adapted for the case of a wave height by modifying the right hand exponential term in equation (15) in line with previous discussion as follows:

$$L(n,m)=e^{2\pi i f \Delta t(n,m)}(e^{2\pi i f s_z(n,m)z(n)}+Re^{-2\pi i f s_z(n,m)(z(n)+2z_w(n))})$$

As discussed at the beginning, it is possible to first calculate the wave height and second calculate the ghost time delay, based on the wave's height. However, it is also possible to combine the wave height calculation with the modified deghosting as now discussed. According to an embodiment, the first and second steps noted above are combined into a single optimization problem. This means that the wave's height information is determined at the same time as performing the up-down separation. Based on the input data, the inversion will attempt to find a wave-field separated representation of the input data in a model domain at the same time as finding the wave's height information.

In one embodiment, this optimization problem is implemented as a non-linear solver surrounding a linear solver, wherein a solver may be a method, technique, process or algorithm. The non-linear solver calculates wave height data such that the results of the linear solver minimize a characteristic of the results. This method includes a step 1900 of initializing the wave-height. This can be achieved by assigning a value of zero to the original wave-height or an estimate from the methods illustrated in FIG. 3, 6, 9, or 12. In step 1902, a deghosting algorithm is applied to the input seismic data. The deghosting algorithm uses a linear solver (any of those discussed above). In step 1904, a characteristic of the result is calculated. This characteristic may be, for example, one of an energy of the residual, an auto-correlation energy of the residual at small lags, Kurtosis of an auto-correlation, a correlation of the input and modelled data, an NRMS (normalized root-mean square) of the residual, etc. In step 1906, the calculated characteristic is compared with a previous value and it is decided whether the characteristic has improved. If the result of this step is yes, then the process keeps the perturbed sea state from the previous non-linear iteration. If the result is no, the process does not keep the perturbed sea state from the previous non-linear iteration.

Then, the method advances to step 1908 during which a trace position is selected at random and the sea state is perturbed by a random amount within limits (e.g., 0.5 m). The characteristic is calculated again in step 1904, based on the new sea state, followed by the comparison step 1906. If the result is yes, steps 1908 and 1904 are repeated again while if the result is no, the method advances to step 1910 to correct the ghost data and then to step 1912 to apply traditional processing steps and generate an image of the subsurface.

While the above method is based on a non-linear scheme, similar to stochastic inversion, other solvers may be used. A non-exhaustive list of solvers includes: Gauss-Newton, Marquardt-Levenberg, Ridge regression, Nelder-Mead (simplex) search, Davidon-Fletcher-Powell method, steepest descent, conjugate gradients, etc.

Figure 20:
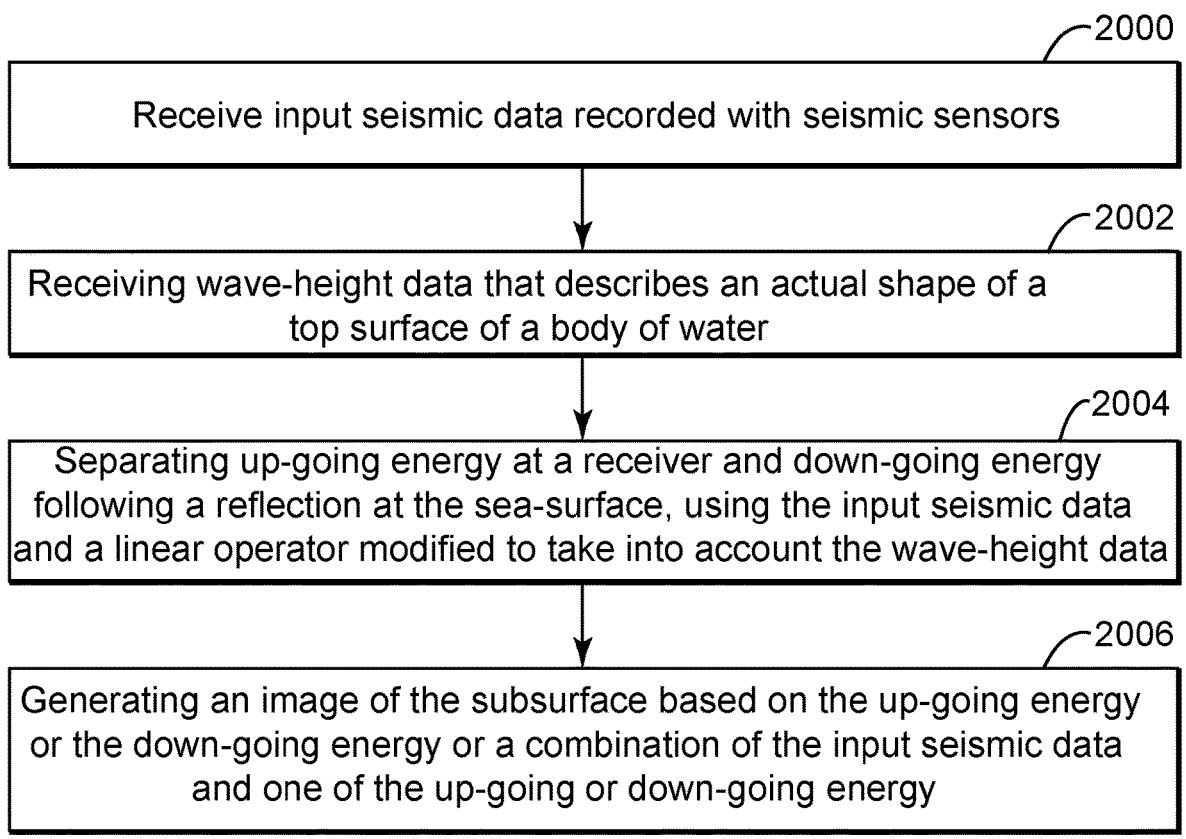
FIG. 20 is a flowchart of a method for reghosting seismic data according to an exemplary embodiment.

A method for wave field reconstruction of seismic data related to a subsurface of a body of water that takes into account a wave's height is now discussed with reference to FIG. 20. The method includes a step 2000 of receiving the seismic data recorded with seismic sensors, a step 2002 of receiving wave-height data that describes an actual shape of a top surface of the body of water, a step 2004 of separating up-going energy at a receiver and down-going energy following a reflection at the sea-surface, using the input seismic data and a linear operator modified to take into account the wave-height data, and a step 2006 of generating an image of the subsurface based on the up-going energy or the down-going energy or a combination of the input seismic data and one of the up-going or down-going energy. The linear operator may be operator L introduced in equations (1) and (2), but having the ghost time modified based on equations (6) and (7).

The following comments and observations apply to any of the above embodiments. The wave-height compensation schemes discussed above may be used to extend most of the known deghosting methods, especially those noted above. The extrapolation step can be applied in a number of different domains, e.g., space-time, fx domain, tau-p domain, FK domain, NMO, etc. The wave's height may be assumed to be constant for each trace or to vary as a function of time. In the case it varies with time, it is possible to calculate the wave's height in overlapping temporal windows. Alternatively, slowly varying temporal re-ghosting operators may be used based on wave-height as defined as a function of time and space.

While various wave-field separation and reconstruction techniques have been discussed, it should be appreciated that it is also possible to combine the results from different approaches. For example, it is possible to use a multi-sensor P/Vz summation for ghost attenuation at high frequencies (for example above 30 Hz) combined with wave-height corrected hydrophone only GWE below 30 Hz. This may combine more than one wave-height corrected approach, or one wave-height corrected approach with a non-wave-height corrected approach.

The wave height data may also be used to improve multiple attenuation by modifying a multiple prediction operator. Multiple prediction operators are convolved with data to estimate multiples and are widely used in seismic processing. One example is a predictive deconvolution operator which may be applied in one or higher dimensions. One example of a 2D operator is given by Hung et al., 2010, "Shallow water demultiple," Australian Society of Exploration Geophysicists conference. Another example using a Green's function relating to a known multiple generator is given by Wang et al., 2011, "Model-based water-layer demultiple," 81$^{st}$ SEG annual conference. Another example is outlined in Poole, G., and Cooper, J, 2015, Inversion-driven free-surface multiple modeling using multiorder Green's functions, SEG conference proceedings. A final example is that of SRME where data is convolved with a primary estimate (initially the data itself) to predict multiples. These and other similar approaches assume a flat sea surface. A known sea surface datum may be used to modify the multiple prediction operator (for example with a time shift or convolution) before convoluting with the data. In particular, this may relate to the processing of an up-going or a down-going wave field by applying a time shift to a trace or an operator (e.g., deconvolution operator or Green's function), where the time shift is based on a wave height. An alternative approach would be to correct the data to a horizontal sea surface before demultiple. The corrected data may then be used to predict multiples based on an operator with or without wave-height compensation. The multiple estimate may further be compensated for wave height as required. Yet another scheme may include separation of up-going and down-going energy (e.g., deghosting), and convolving down-going energy with an operator that has not been compensated for wave-height datum to estimate an up-going or down-going multiple at a receiver.

While various demultiple techniques have been discussed, it should be appreciated that it is also possible to combine the results from different approaches. For example, it is possible to use a wave height corrected model-based water-layer demultiple at high frequencies (for example above 30 Hz) combined with wave height corrected 2D deconvolution below 30 Hz. This may combine more than one wave-height corrected approach, or one wave-height corrected approach with a non-wave-height corrected approach.

Wave height compensation may be important for time lapse processing. It is possible to compensate for wave-height effects on a base and/or a monitor dataset, modify the ghost timing of a monitor survey to match the base, or modify the ghost timing of a base survey to match a monitor survey. Likewise, removing the ghost from the base and monitor survey using wave height information will result in the up-going wavefields from base and monitor being more closely matched, for example, measured by NRMS. The scheme may also include a receiver motion or a source motion correction as described in some of the references noted above. In some cases data from a first dataset will be used to remove multiples from a second dataset. In this case, a wave-height correction operator may be applied to encode a wave height on to a multiple model calculated on a first dataset to match waves on a second dataset.

Wave height calculations will naturally vary depending on the apparent dip of the input data. Ghost-timing corrections should ideally be modified to calculate the timing deviation in a vertical direction before calculating the wave height in meters. This may be based on a hyperbolic estimation of slowness or use calculations in the tau-p domain.

For practical reasons, detrimental wave field separation effects due to wave height may only be of concern for higher frequencies. Therefore, any modification may only be necessary for a given frequency range and not necessarily adopted for all frequencies.

The source and/or sensors discussed above may be moving or stationary. Input data may relate to land, marine, or transition zone data. Particle motion data may consist of accelerometers, differential pressure, particle motion, particle velocity, or other particle motion data. Seismic sources may relate to pingers, boomers, airguns, marine vibrators, dynamite, weight drop, VibroSeis or another source.

Figure 22:
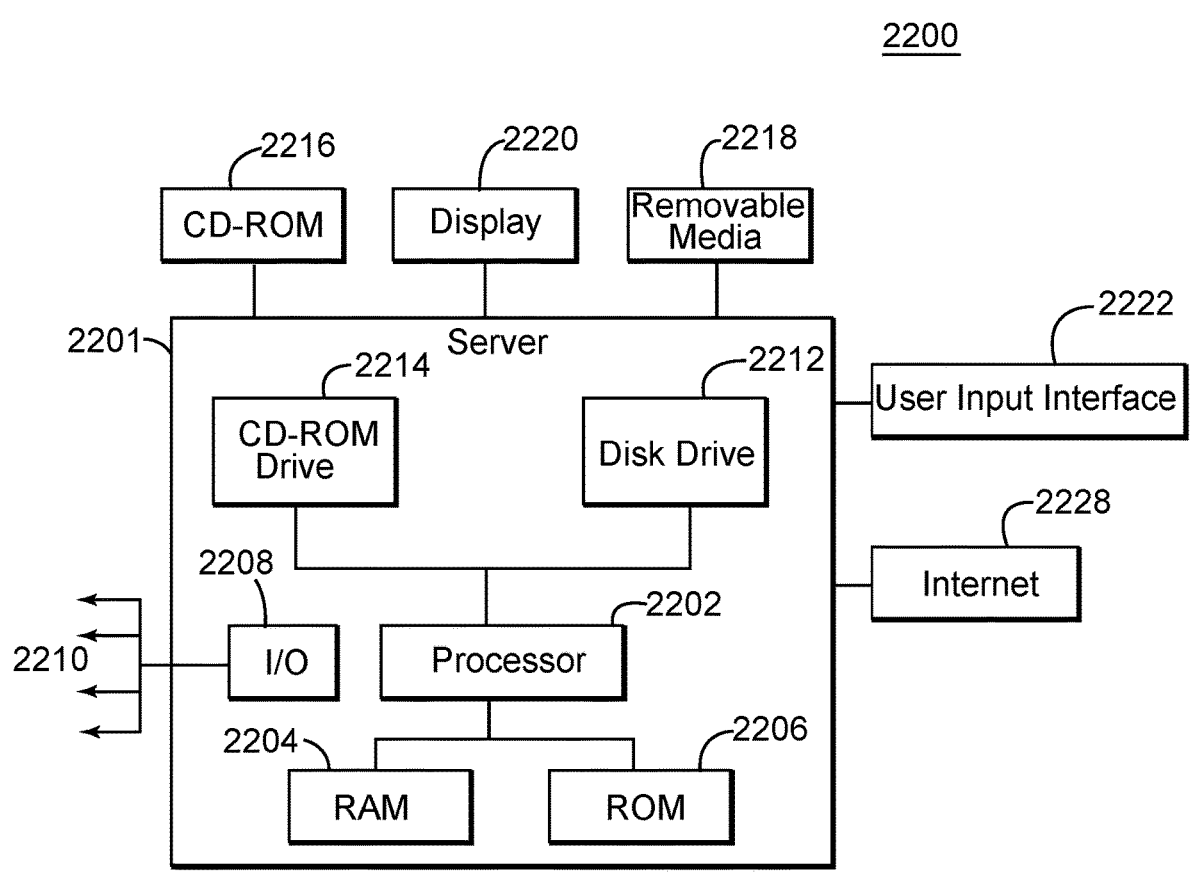
FIG. 22 is a schematic diagram of a computing device configured to implement any of the above methods.

The above-discussed procedures and methods may be implemented in a computing device illustrated in FIG. 22. Hardware, firmware, software or a combination thereof may be used to perform the various steps and operations described herein. The computing device 2200 of FIG. 22 is an exemplary computing structure that may be used in connection with such a system.

The exemplary computing device 2200 suitable for performing the activities described in the exemplary embodiments may include a server 2201. Such a server 2201 may include a central processor (CPU) 2202 coupled to a random access memory (RAM) 2204 and to a read-only memory (ROM) 2206. The ROM 2206 may also be other types of storage media to store programs, such as programmable ROM (PROM), erasable PROM (EPROM), etc. The processor 2202 may communicate with other internal and external components through input/output (I/O) circuitry 2208 and bussing 2210, to provide control signals and the like. The processor 2202 carries out a variety of functions as are known in the art, as dictated by software and/or firmware instructions.

The server 2201 may also include one or more data storage devices, including hard drives 2212, CD-ROM drives 2214, and other hardware capable of reading and/or storing information such as DVD, etc. In one embodiment, software for carrying out the above-discussed steps may be stored and distributed on a CD-ROM or DVD 2216, a USB storage device 2218 or other form of media capable of portably storing information. These storage media may be inserted into, and read by, devices such as the CD-ROM drive 2214, the disk drive 2212, etc. The server 2201 may be coupled to a display 2220, which may be any type of known display or presentation screen, such as LCD displays, plasma display, cathode ray tubes (CRT), etc. A user input interface 2222 is provided, including one or more user interface mechanisms such as a mouse, keyboard, microphone, touchpad, touch screen, voice-recognition system, etc.

The server 2201 may be coupled to other devices, such as sources, detectors, etc. The server may be part of a larger network configuration as in a global area network (GAN) such as the Internet 2228, which allows ultimate connection to the various landline and/or mobile computing devices. In one embodiment, the computing device 2200 is a dedicated machine that is configured to execute teraflops of operations on hundreds if not thousands of cores.

The disclosed exemplary embodiments provide a computing device and a method for seismic data processing. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for seismic exploration of a subsurface formation under the seafloor, the method comprising:
receiving input seismic data recorded with seismic sensors configured to detect seismic waves traveling through the subsurface formation;
obtaining wave-height data using the input seismic data;
processing up-going energy and down-going energy following a reflection at the sea-surface extracted from the input seismic data corresponding to one of the sensors and using a linear operator modified to take into account the wave-height data; and
generating an image of the subsurface formation using the up-going energy or the down-going energy or a combination of the input seismic data and one of the up-going or down-going energy,
wherein the image enables detecting a hydrocarbon reservoir in the subsurface formation.

2. The method of claim 1, wherein the down-going energy is subsequently reflected or refracted in the subsurface formation and then recorded by another seismic sensor.

3. The method of claim 1, wherein the up-going energy and/or the down-going energy is representative of a wavefield at hypothetical receiver positions, not at a position of an input trace.

4. The method of claim 1, wherein the linear operator contains separate terms representing primary and ghost energy.

5. The method of claim 1, wherein the linear operator includes a reverse model transform.

6. The method of claim 1, wherein the linear operator is a multiple prediction operator, and the method further comprising:
modifying the multiple prediction operator using the wave-height data,
convolving, with a computing device, the modified operator with the seismic data to generate modified seismic data; and
generating the image of the subsurface formation using the modified seismic data.

7. The method of claim 6, wherein the multiple prediction operator predicts multiples associated with the input seismic data.

8. The method of claim 1, wherein the input seismic data is single or multi-component data.

9. The method of claim 1, wherein the obtaining of the wave-height data comprises:
calculating a height of a wave that describes a top surface of the body of water, for each seismic sensor.

10. The method of claim 9, wherein the step of calculating a height of the wave comprises:
extrapolating the input seismic data to align primary and ghost wave fields;
cross-correlating the aligned primary and ghost wave fields; and
calculating the height of the wave using a lag obtained at the step of cross-correlating.

11. The method of claim 9, wherein the step of calculating a height of the wave comprises:
calculating up-going and down-going wave fields using a deghosting method;
aligning the up-going and down-going fields using a wave field extrapolation method using a horizontal top surface;
cross-correlating the aligned up-going and down-going wave fields; and
calculating the height of the wave using a lag obtained at the cross-correlating step.

12. The method of claim 9, wherein the input data is filtered, and the data before and after filtering are cross-correlated to determine a wave height.

13. The computing device of claim 1, wherein the linear operator is a multiple prediction operator, and the processor is further configured to:
modify the multiple prediction operator using the wave-height data,
convolve, with a computing device, the modified operator with the seismic data to generate modified seismic data; and
generate the image of the subsurface formation using the modified seismic data.

14. The computing device of claim 13, wherein the multiple prediction operator predicts multiples associated with the input seismic data.

15. A computing device for seismic exploration of a subsurface formation, the computing device comprising:
an interface for receiving input seismic data recorded with seismic sensors configured to detect seismic waves traveling through the subsurface formation, and wave-height data obtained from the input seismic data; and
a processor connected to the interface and configured to,
process up-going energy at a receiver and down-going energy following a reflection at the sea-surface extracted from the input seismic data and using a linear operator modified to take into account the wave-height data, and
generate an image of the subsurface formation using the up-going energy or the down-going energy or a combination of the input seismic data and one of the up-going or down-going energy,
wherein the image enables detecting a hydrocarbon reservoir in the subsurface formation.

16. The computing device of claim 15, wherein the down-going energy is subsequently reflected or refracted in the subsurface formation and then recorded by another seismic sensor.

17. The computing device of claim 15, wherein the up-going energy and/or the down-going energy is representative of a wave-field at hypothetical receiver positions, not at a position of an input trace.

18. The computing device of claim 15, wherein the linear operator contains separate terms representing primary and ghost energy.

19. The computing device of claim 15, wherein the linear operator includes a reverse model transform.

20. A non-transitory computer readable medium including computer executable instructions, wherein the instructions, when executed by a processor, implement instructions for seismic exploration of a subsurface formation under the seafloor, the instructions comprising:
receiving input seismic data recorded with seismic sensors configured to detect seismic waves traveling through the subsurface formation;
obtaining wave-height data using the input seismic data;
processing up-going energy at a receiver and down-going energy following a reflection at the sea-surface from the input seismic data and using a linear operator modified to take into account the wave-height data; and
generating an image of the subsurface formation using the up-going energy or the down-going energy or a combination of the input seismic data and one of the up-going or down-going energy,
wherein the image enables detecting a hydrocarbon reservoir in the subsurface formation.

* * * * *